(12) United States Patent
Sun et al.

(10) Patent No.: US 6,498,677 B1
(45) Date of Patent: *Dec. 24, 2002

(54) OPTICAL AMPLIFIER SYSTEMS WITH TRANSIENT CONTROL

(75) Inventors: Yan Sun, Menlo Park, CA (US); Jun Ye, Palo Alto, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/729,082

(22) Filed: Dec. 5, 2000

Related U.S. Application Data
(60) Provisional application No. 60/242,133, filed on Oct. 23, 2000.

(51) Int. Cl.$^7$ .......................... H04B 10/12; H04B 10/02
(52) U.S. Cl. ................ 359/341.4; 359/177; 359/337.11
(58) Field of Search ....................... 359/341.41, 341.42, 359/337.1, 337.12, 337.2, 337.11, 177, 341.4

(56) References Cited

U.S. PATENT DOCUMENTS

| | | | |
|---|---|---|---|
| 5,245,690 A | 9/1993 | Aida et al. ................... | 385/142 |
| 5,253,104 A | 10/1993 | Delavaux .................... | 359/341 |
| 5,268,786 A | * 12/1993 | Matsushita et al. ......... | 359/177 |
| 5,374,973 A | * 12/1994 | Maxham et al. ............. | 359/177 |
| 5,497,264 A | * 3/1996 | Bayat .......................... | 359/337 |
| 5,506,724 A | * 4/1996 | Shimizu ...................... | 359/341 |
| 5,513,029 A | 4/1996 | Roberts ....................... | 359/177 |
| 5,745,283 A | 4/1998 | Inagaki et al. ............... | 359/341 |
| 5,812,710 A | 9/1998 | Sugaya ........................ | 385/27 |
| 5,818,629 A | * 10/1998 | Kinoshita .................... | 359/194 |
| 5,828,486 A | * 10/1998 | Yoshida ....................... | 359/134 |
| 5,861,981 A | 1/1999 | Jabr ............................. | 359/341 |
| 5,864,423 A | * 1/1999 | Kosaka ........................ | 359/341 |
| 5,864,581 A | 1/1999 | Alger-Meunier et al. ... | 375/224 |

(List continued on next page.)

FOREIGN PATENT DOCUMENTS

| | | |
|---|---|---|
| EP | 0 734 105 A2 | 9/1996 |
| EP | 762 667 A2 | 3/1997 |
| JP | 11-275027 A2 | 8/1999 |
| WO | WO 97/28584 | 8/1997 |
| WO | WO 99/66607 | 12/1999 |
| WO | WO 99/67609 | 12/1999 |
| WO | WO 00/4613 A1 | 1/2000 |
| WO | WO 00/14909 | 3/2000 |
| WO | WO 00/41346 A1 | 7/2000 |
| WO | WO 00/49721 | 8/2000 |

OTHER PUBLICATIONS

Nillson. J. and Jaskorzynska, B. "Alternating Cascade of Spectrally Different Erbium–Doped Fiber Amplifiers for Link–Loss–Insensitive Long–Haul WDM Transmission." J. Lightwave Tech. vol. 17, No. 3, Mar. 1999. pp 434–444.*

Na, K.–W. et al. "A Cost Effective Gain Control Using Pump Modulation for Erbium–Doped Fiber Amplifiers." IEEE Photonics Tech. Lett. vol. 12, No. 4, Apr. 2000. pp. 383–385.*

(List continued on next page.)

*Primary Examiner*—Thomas H. Tarcza
*Assistant Examiner*—Andrew R. Sommer
(74) *Attorney, Agent, or Firm*—Fish & Neave; G. Victor Treyz

(57) ABSTRACT

Optical amplifiers are provided for use in fiber-optic communications networks. Gain may be provided using one or more rare-earth-doped fiber coils such as erbium-doped fiber coils. The coils may be pumped by laser diodes or other suitable pumps. The optical output power of the pumps in a given amplifier may be controlled by a control unit. Taps may be used to monitor the power of optical signals being amplified by the amplifier. The tapped optical signals may be spectrally-filtered. The control unit may calculate the appropriate pump power for the pumps to supply to the fiber coils based on the measured spectrally-filtered optical signals. The gain of the amplifier may be maintained at a desired level using feedback control techniques. The gain spectrum of the amplifier need not be flat. A combination of feedforward and feedback techniques may be used to calculate the pump power to be supplied by the pumps.

8 Claims, 23 Drawing Sheets

U.S. PATENT DOCUMENTS

| | | | | |
|---|---|---|---|---|
| 5,900,969 A | | 5/1999 | Srivastava et al. | 359/341 |
| 5,907,429 A | * | 5/1999 | Sugata | 359/341 |
| 5,912,750 A | * | 6/1999 | Takeda | 359/124 |
| 5,933,262 A | * | 8/1999 | Sasagawa | 359/127 |
| 5,933,552 A | | 8/1999 | Fukushima et al. | 385/24 |
| 5,966,236 A | * | 10/1999 | Okuno | 359/337 |
| 5,969,834 A | | 10/1999 | Farber et al. | 359/110 |
| 5,995,275 A | * | 11/1999 | Sugaya | 359/341 |
| 6,008,935 A | * | 12/1999 | Fujita et al. | 359/134 |
| 6,016,213 A | | 1/2000 | Farber et al. | 359/177 |
| 6,025,947 A | * | 2/2000 | Sugaya | 359/160 |
| 6,038,061 A | * | 3/2000 | Sugaya | 359/160 |
| 6,049,413 A | | 4/2000 | Taylor et al. | 359/337 |
| 6,055,093 A | * | 4/2000 | Chikuma | 359/337 |
| 6,061,171 A | | 5/2000 | Taylor et al. | 359/341 |
| 6,072,601 A | * | 6/2000 | Toyohara | 358/484 |
| 6,091,541 A | * | 7/2000 | Yoon | 359/341 |
| 6,094,296 A | * | 7/2000 | Kosaka | 359/341 |
| 6,094,298 A | | 7/2000 | Luo et al. | 359/346 |
| 6,115,174 A | | 9/2000 | Grubb et al. | 359/334 |
| 6,144,485 A | | 11/2000 | Sugaya et al. | 359/337 |
| 6,151,157 A | | 11/2000 | Ball et al. | 359/341 |
| 6,151,160 A | * | 11/2000 | Ma | 359/341 |
| 6,160,659 A | | 12/2000 | Kinoshita | 359/337 |
| 6,163,399 A | | 12/2000 | Berg | 359/341 |
| 6,166,850 A | | 12/2000 | Roberts et al. | 359/341 |
| 6,172,803 B1 | * | 1/2001 | Masuda et al. | 359/334 |
| 6,198,570 B1 | | 3/2001 | Fukushima et al. | 359/337 |
| 6,198,572 B1 | | 3/2001 | Sugaya et al. | 359/337 |
| 6,204,959 B1 | * | 3/2001 | Fujita et al. | 359/124 |
| 6,215,581 B1 | | 4/2001 | Yadlowsky | 359/337 |
| 6,236,499 B1 | | 5/2001 | Berg et al. | 359/341 |
| 6,246,514 B1 | * | 6/2001 | Bonnedal et al. | 359/124 |
| 6,252,699 B1 | * | 6/2001 | Kohn | 359/177 |
| 6,288,836 B1 | * | 9/2001 | Kawasaki | 359/341.42 |
| 6,356,386 B1 | * | 3/2002 | Denkin et al. | 359/124 |
| 6,366,393 B1 | * | 4/2002 | Feulner et al. | 359/337 |
| 6,366,395 B1 | * | 4/2002 | Drake et al. | 359/337 |

OTHER PUBLICATIONS

Karasek, M. et al. "Effectiveness of Gain Control in EDFAs Against s Traffic with Different Levels of Bursty Behaviour." IEE Proc.–Optoelectron. vol. 147, No. 5, Oct. 2000. pp. 355–362.*

Takahashi, N. et al. "An Output Powre Stabilized Erbium–Doped Fiber AMplifier with Automatic Gain Control." IEEE J. Selecte Topics Quantum Elect. vol. 3, No. 4, Aug. 1997, pp. 1019–1026.*

Hayee, M.I. et al. "Transmission Penalties Due to EDFA Gain Transients in Add–Drop Multiplexed WDM Networks." IEEE Photonics Tech. Lett. vol. 11, No. 7, Jul. 1999. pp. 889–891.*

Becker, P.C. et al. "Erbium–Doped Fiber Amplifiers: Fundamentals and Technology." Academic Press, San Diego. 1999. pp. 251–319.*

Yadlowsky, M.J. et al. "Optical Fiber Amplifiers for WDM Systems." Proceedings of IEEE. vol. 85, No. 11, Nov. 1997. pp. 1765–1779.*

Sun et al. "Optical Fiber Amplifiers for WDM Optical Networks" Bell Labs Journal, p. 187–206, Jan.–Mar., 1999.

Nortel Networks Datasheet "MGM Multiwavelength Gain Module" (Nov. 3, 2000).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communications Conference, Technical Digest, p. 6–8, (Mar. 8, 2000).

Delavaque et al. "Gain Control in Erubium–Doped Fibre Amplifiers by Lasing at 1480nm With Photoinduced Bragg Gratings Written on Fibre Ends" Electronics Letters, vol. 29, No. 12, pp. 1112–1114, Jun. 10, 1993.

Massicott et al., "1480nm Pumped Erbium Doped Fibre Amplifier with all Optical Automatic Gain" Electronics Letters, vol. 30, No. 12 p. 962–964, Jun. 9, 1994.

Zhu et al. "1.28 Tbit/s (32 × 40 Gbit/s) Transmission over 1000 km NDSF Employing Distributed Raman Amplification and Active Gain Flattening" Electronics Letters, vol. 37, No. 1, p. 43–45 (Jan. 4, 2001).

Takeda et al. "Active Gain Tilt Equalization by Preferentially 1.43$\mu$m–or 1.48$\mu$m–Pumped Raman Amplification" OSA Optical Amplifiers and their Applications, vol. 30, p. 101–105 (1999).

Motoshima et al. "EDFA with Dynamic Gain Compensation for Multiwavelength Transmission Systems" OFC '94 Technical Digest, p. 191–192.

Zirngibl et al. "Gain Control in Erbium–Doped Fibre Amplifiers by an All Optical Feedback Loop" Electronics Letters, vol. 27, No. 7, p. 560–561, Mar. 28, 1991.

* cited by examiner

|  | $P_{IN}$ | $P_A$ | GEF | $P_{OUT}$ |
|---|---|---|---|---|
| CH 1 | .01W | 1/2 W | 1/3 | 1/6 W |
| CH 2 | .01W | 1/3 W | 1/2 | 1/6 W |
| CH 3 | .01W | 1/6 W | 1 | 1/6 W |

*FIG. 7*

|  | $P_{IN}$ | $P_A$ | GEF | $P_{OUT}$ |
|---|---|---|---|---|
| CH 1 | .01W | 1/3 W | 1/3 | 1/9 W |
| CH 2 | 0 | 0 | 1/2 | 0 |
| CH 3 | 0 | 0 | 1 | 0 |

*FIG. 8*

|  | $P_{IN}$ | $P_A$ | GEF | $P_{OUT}$ |
|---|---|---|---|---|
| CH 1 | 0 | 0 | 1/3 | 0 |
| CH 2 | 0 | 0 | 1/2 | 0 |
| CH 3 | .01 | 1/3 W | 1 | 1/3 W |

*FIG. 9*

|      | $P_{IN}$ | SPECTRUM FILTER | $P_B$ | $P_C$ | GEF | $P_{OUT}$ |
|------|------|------|------|------|------|------|
| CH 1 | .01W | 1    | .01W | 1/2 W | 1/3 | 1/6 W |
| CH 2 | .01W | 2/3  | .0067W | 1/3 W | 1/2 | 1/6 W |
| CH 3 | .01W | 1/3  | .0033W | 1/6 W | 1   | 1/6 W |
| TOTAL | .03W |     | .02W | 1 W  |     | 1/2 W |

*FIG. 12*

|  | $P_{IN}$ | SPECTRUM FILTER | $P_B$ | $P_C$ | GEF | $P_{OUT}$ |
|---|---|---|---|---|---|---|
| CH 1 | .01W | 1 | .01W | 1/2 W | 1/3 | 1/6 W |
| CH 2 | 0 | 2/3 | 0 | 0 | 1/2 | 0 |
| CH 3 | 0 | 1/3 | 0 | 0 | 1 | 0 |

FIG. 13

|  | $P_{IN}$ | SPECTRUM FILTER | $P_B$ | $P_C$ | GEF | $P_{OUT}$ |
|---|---|---|---|---|---|---|
| CH 1 | 0 | 1 | 0 | 0 | 1/3 | 0 |
| CH 2 | .01W | 2/3 | .0067W | 1/3 W | 1/2 | 1/6 W |
| CH 3 | 0 | 1/3 | 0 | 0 | 1 | 0 |

FIG. 14

|  | $P_{IN}$ | SPECTRUM FILTER | $P_B$ | $P_C$ | GEF | $P_{OUT}$ |
|---|---|---|---|---|---|---|
| CH 1 | 0 | 1 | 0 | 0 | 1/3 | 0 |
| CH 2 | 0 | 2/3 | 0 | 0 | 1/2 | 0 |
| CH 3 | .01W | 1/3 | .0033 W | 1/6 W | 1 | 1/6 W |

FIG. 15

|  | $P_{IN}$ | $P_{OUT}$ |
|---|---|---|
| CH 1 | 0.01W | 0.3 W |
| CH 2 | 0.01W | 0.2 W |
| CH 3 | 0.01W | 0.1 W |
| TOTAL | 0.03W | 0.6 W |

FIG. 19

|  | $P_{IN}$ | $P_{OUT}$ |
|---|---|---|
| CH 1 | 0.01W | 0.2 W |
| CH 2 | 0 | 0 |
| CH 3 | 0 | 0 |
| TOTAL | 0.01W | 0.2 W |

FIG. 20

|  | $P_{IN}$ | SPECTRUM FILTER | $P_F$ | $P_{OUT}$ |
|---|---|---|---|---|
| CH 1 | 0.01W | 1/3 | 0.1W | 0.3W |
| CH 2 | 0.01W | 1/2 | 0.1W | 0.2W |
| CH 3 | 0.01W | 1 | 0.1W | 0.1W |
| TOTAL | 0.03W |  | 0.3W |  |

FIG. 22

|  | $P_{IN}$ | SPECTRUM FILTER | $P_F$ | $P_{OUT}$ |
|---|---|---|---|---|
| CH 1 | 0.01W | 1/3 | 0.1W | 0.3W |
| CH 2 | 0 | 1/2 | 0 | 0 |
| CH 3 | 0 | 1 | 0 |  |
| TOTAL | 0.01W |  | 0.1W |  |

FIG. 23

|  | $P_{IN}$ | SPECTRUM FILTER | $P_F$ | $P_{OUT}$ |
|---|---|---|---|---|
| CH 1 | 0 | 1/3 | 0 | 0 |
| CH 2 | 0.01W | 1/2 | 0.1W | 0.2W |
| CH 3 | 0 | 1 | 0 | 0 |
| TOTAL | 0.01W |  | 0.1W |  |

FIG. 24

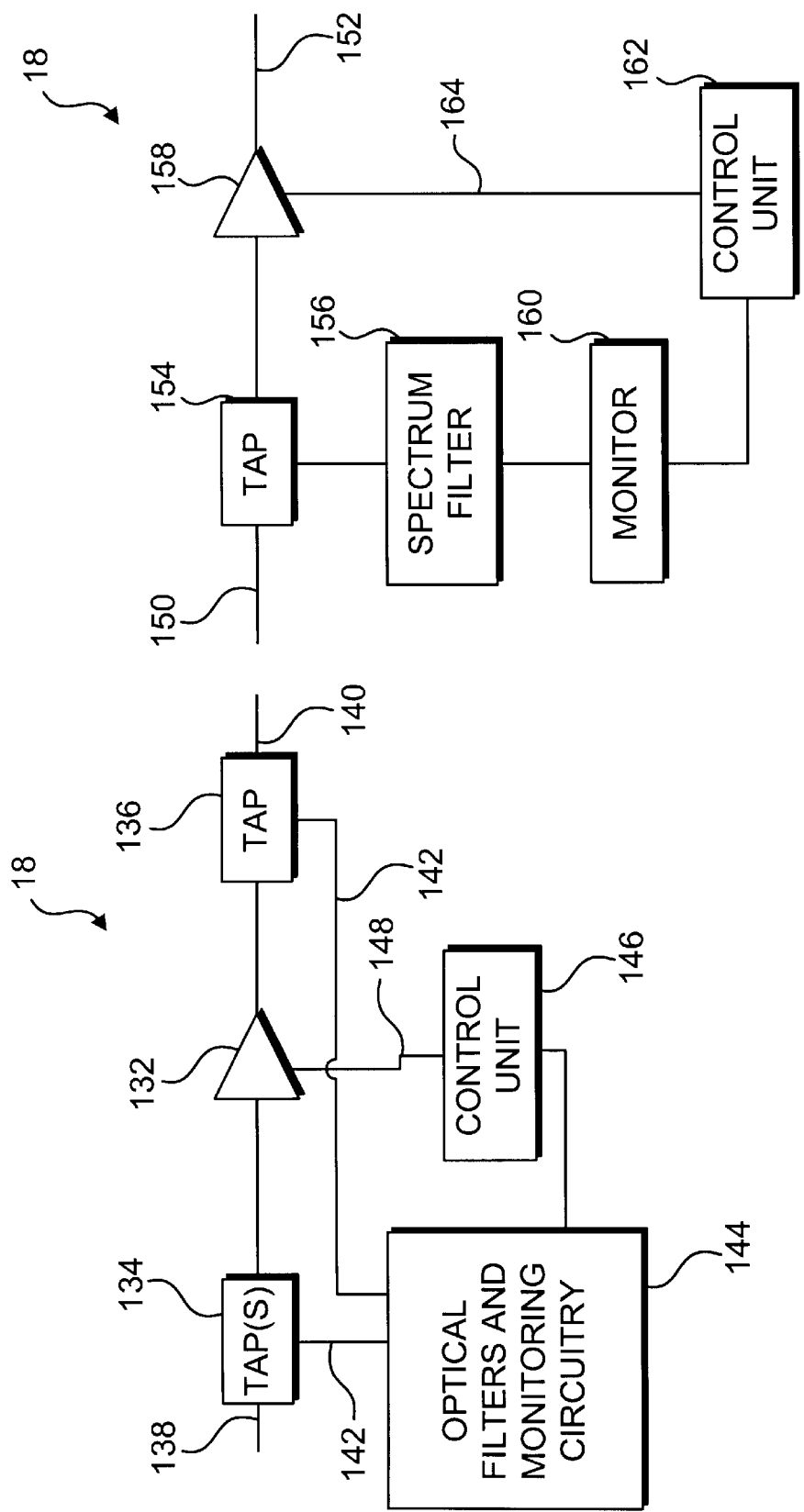

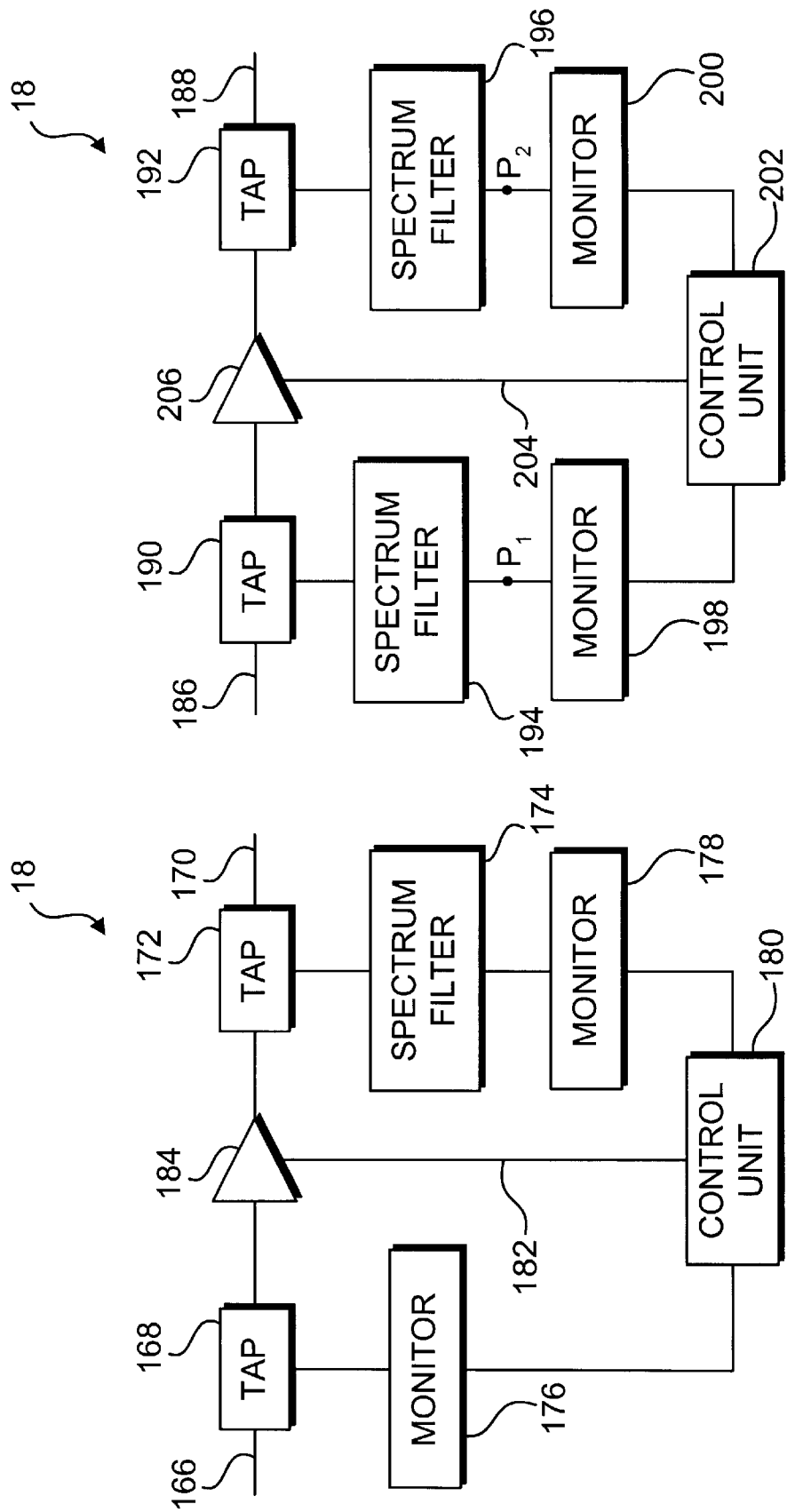

OPTICAL AMPLIFIER SYSTEMS WITH TRANSIENT CONTROL

This application claims the benefit of provisional patent application No. 60/242,133, filed Oct. 23, 2000.

BACKGROUND OF THE INVENTION

The present invention relates to fiber-optic communications networks, and more particularly, to optical amplifiers with transient control capabilities for use in optical communications networks.

In optical networks that use wavelength division multiplexing, multiple wavelengths of light are used to support multiple communications channels on a single fiber. Optical amplifiers are used in such networks to amplify optical signals that have been subject to attenuation over multi-kilometer fiber-optic links. A typical amplifier may include erbium-doped fiber amplifier components that are pumped with diode lasers. The erbium-doped fiber amplifier stages increase the strength of the optical signals being transmitted over the fiber-optic links.

The gain of the erbium-doped fiber amplifier stages depends on the inversion level of erbium ions in the fiber. If, for example, the inversion level of a given stage is high, the gain of the stage will be high. If the inversion level of a stage is low, the gain of the stage will be low. Unless control electronics are used to maintain a steady inversion level under various operating conditions, the gain of erbium-doped fiber amplifier stages will be subject to unacceptable transients. Gain transients in an amplifier may cause fluctuations in the power of the output signals from the amplifier. If the output signals are too weak, it may not be possible to detect the signals. If the output signals are too strong, the signals may be subject to nonlinear optical effects in the fiber.

It is an object of the present invention to provide optical amplifier systems in which gain transients are controlled.

SUMMARY OF THE INVENTION

This and other objects of the invention are accomplished in accordance with the present invention by providing optical amplifiers that use taps to monitor optical signal powers. The amplifiers may contain one or more diode-laser-pumped rare-earth-doped fiber coils for providing optical gain. Optical filters may be used to modify the optical signal powers that have been tapped.

The input power to an amplifier may be filtered using a spectrum filter that matches the gain spectrum of the rare-earth-doped fiber coils. This allows a feed-forward approach to be used to control the pump power for the coils, even if the gain spectrum of the coils is not flat.

The output power from the amplifier may be filtered using a spectrum filter that flattens the overall gain spectrum of the amplifier. This allows a feedback approach to be used to control the pump power for the coils, even if the gain spectrum of the amplifier is not flat.

A combination of feed-forward and feedback techniques may be used to control amplifier transients. Spectrum filters may be used on both input and output taps.

Further features of the invention and its nature and various advantages will be more apparent from the accompanying drawings and the following detailed description of the preferred embodiments.

BRIEF DESCRIPTION OF THE DRAWINGS

FIG. 7 is a table showing input and output conditions for a fiber amplifier of the type shown in FIG. 6 when three channels are being carried.

FIG. 8 is a table showing input and output conditions for a fiber amplifier of the type shown in FIG. 6 when the last two of the three channels of FIG. 7 have been dropped and a feed-forward control scheme without spectral filtering of the input power is being used.

FIG. 9 is a table showing input and output conditions for a fiber amplifier of the type shown in FIG. 6 when the first two of the three channels of FIG. 7 have been dropped and a feed-forward control scheme without spectral filtering of the input power is being used.

FIG. 12 is a table showing input and output conditions for a fiber amplifier of the type shown in FIG. 10 when three illustrative channels are being carried in accordance with the present invention.

FIG. 13 is a table showing input and output conditions for a fiber amplifier of the type shown in FIG. 10 when the last two of three illustrative channels have been dropped in accordance with the present invention.

FIG. 14 is a table showing input and output conditions for a fiber amplifier of the type shown in FIG. 10 when the first and last of three illustrative channels have been dropped in accordance with the present invention.

FIG. 15 is a table showing input and output conditions for a fiber amplifier of the type shown in FIG. 10 when the first two of three illustrative channels have been dropped in accordance with the present invention.

FIG. 19 is a table showing illustrative output powers for each of three channels when using an amplifier with a gain spectrum such as that shown in FIG. 18.

FIG. 20 is a table showing the output powers for each of the three channels of FIG. 19 when two of the input signals have been dropped and when an unfiltered feedback-based control scheme is being used to control transients.

FIG. 22 is a table showing input and output conditions for a fiber amplifier of the type shown in FIG. 21 when three illustrative channels are being carried in accordance with the present invention.

FIG. 23 is a table showing input and output conditions for a fiber amplifier of the type shown in FIG. 21 when the last two of the three illustrative channels have been dropped in accordance with the present invention.

FIG. 24 is a table showing input and output conditions for a fiber amplifier of the type shown in FIG. 21 when the first and last of the three illustrative channels have been dropped in accordance with the present invention.

FIG. 27 is a generalized schematic diagram of an illustrative optical amplifier having spectrum filters for filtering tapped optical powers for transient control in accordance with the present invention.

FIG. 28 is a schematic diagram of an illustrative optical amplifier having a spectrum filter for filtering tapped optical input signals for use in transient control schemes in accordance with the present invention.

FIG. 29 is a schematic diagram of an illustrative optical amplifier having a spectrum filter for filtering tapped optical output signals for use in transient control schemes in accordance with the present invention.

FIG. 30 is a schematic diagram of an illustrative optical amplifier having spectrum filters for filtering tapped optical input and output signals for use in transient control schemes in accordance with the present invention.

DETAILED DESCRIPTION OF THE PREFERRED EMBODIMENTS

Figure 1:
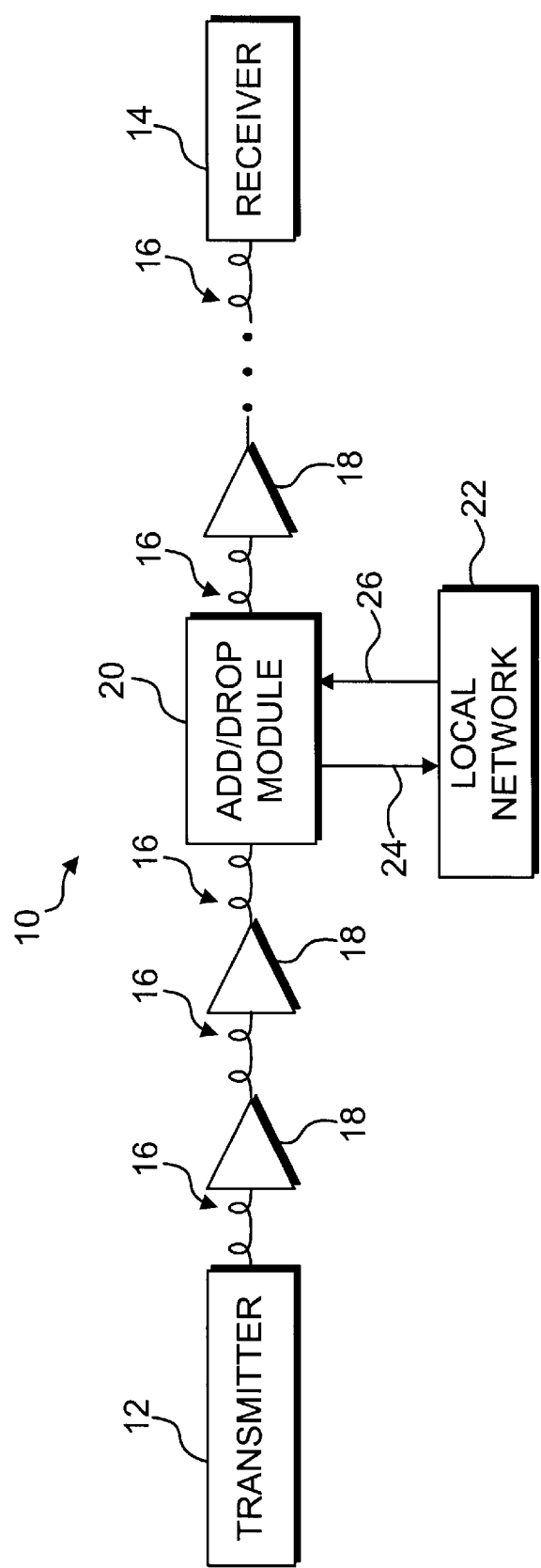
FIG. 1 is a schematic diagram of an illustrative optical communications link using optical amplifiers with transient control capabilities in accordance with the present invention.

An illustrative optical communications link 10 in accordance with the present invention is shown in FIG. 1. A transmitter 12 may transmit information to a receiver 14 over a series of fiber links. Each fiber link may include a span 16 of optical fiber. Fiber spans may be on the order of 40–160 km in length for long-haul networks or may be any other suitable length for use in signal transmission in an optical communications network.

As optical signals travel along the optical fibers 16, signal strength is attenuated. Optical amplifiers 18 may therefore be used to amplify the optical signals between successive spans of fiber.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1530–1560 nm. These are merely illustrative system characteristics. If desired, more channels may be provided (e.g., hundreds of channels), signals may be modulated at slower or faster data rates (e.g., at approximately 2.5 Gbps for OC-48 or at approximately 40 Gbps for OC-768), and a wider range of carrier wavelengths may be supported (e.g., 1280–1625 nm).

Transmitter 12 may include laser diodes each of which supports a channel operating at a different wavelength. If one or more of these lasers is taken out of service or if new channels are added at transmitter 12, the number of wavelengths being transmitted across link 10 may change abruptly. The number of channels being carried by link 10 may also change due to unexpected system failures such as fiber cuts.

Link 10 may include add/drop modules such as add/drop module 20. Module 20 may be used to separate channels at certain wavelengths from the main fiber path in link 10. The separated channels may be provided to a local network such as local network 22 over a fiber link 24. Communications traffic from the local network may be provided to module 20 over a fiber link 26. If link 26 is cut accidentally or if the network is reconfigured so that a different number of channels are provided over the fiber span fed by module 20, the number of channels carried by link 10 following add/drop module 20 may change abruptly.

Figure 2:
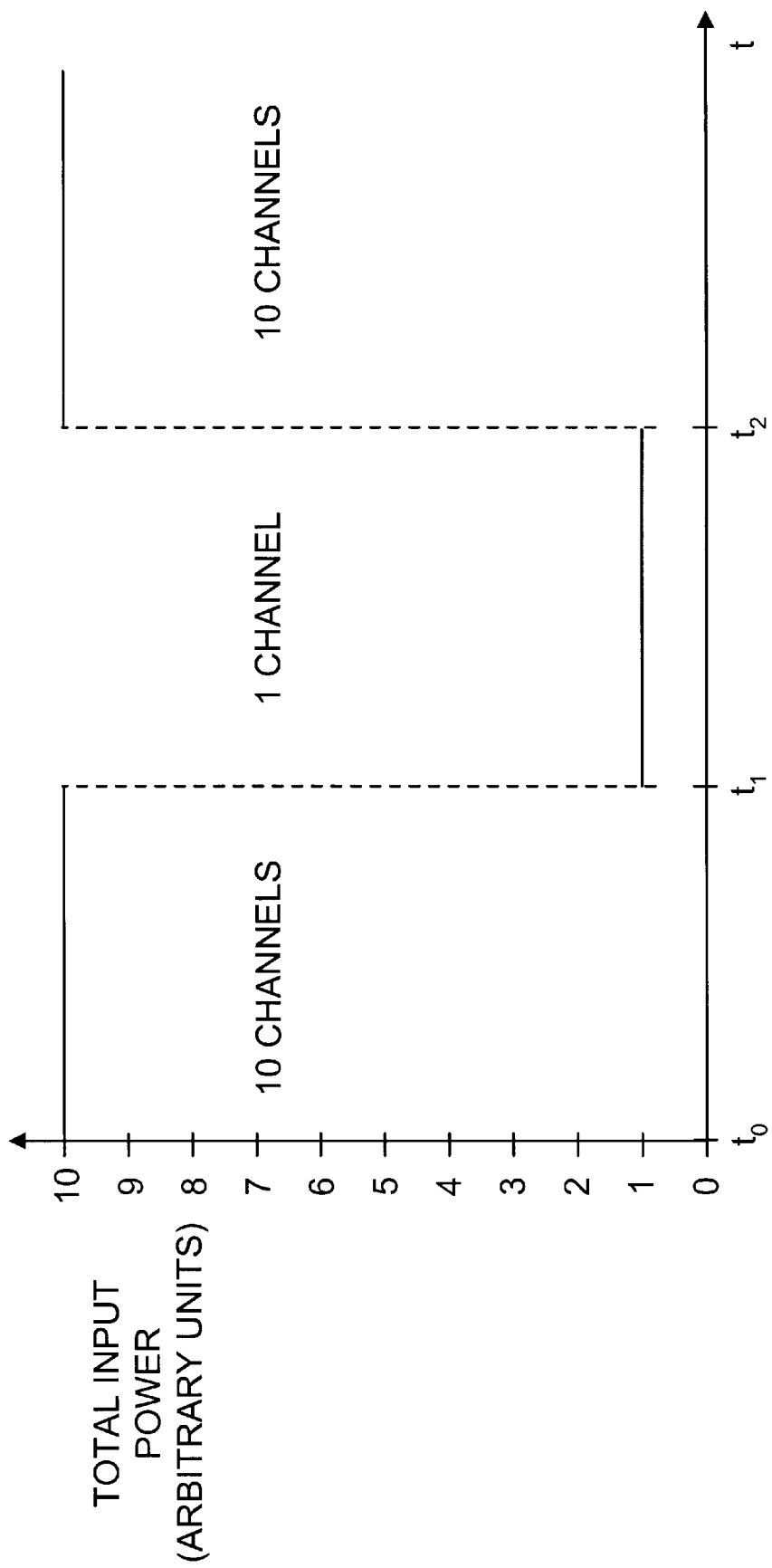
FIG. 2 is a graph showing how the input power applied to an optical amplifier may change suddenly when the number of channels handled by the amplifier changes.

A graph showing how the total signal power carried by a fiber in a link such as link 10 of FIG. 1 may vary under transient conditions is shown in FIG. 2. In the example of FIG. 2, the fiber link is initially carrying ten signal channels. The total input power at a given amplifier 18 of link 10 is therefore relatively constant between time $t_0$ and $t_1$. At time $t_1$, nine of the original channels are dropped (e.g., due to a system failure or an intentional system reconfiguration). As a result, the total power applied to the input of the given amplifier 18 drops to one tenth of its original level. At time $t_2$, the nine dropped channels are restored, so that the system is again handling ten channels. The total input power to the amplifier therefore increases abruptly. As illustrated by this example, optical amplifiers must handle transients due to both added channels and dropped channels.

Figure 3:
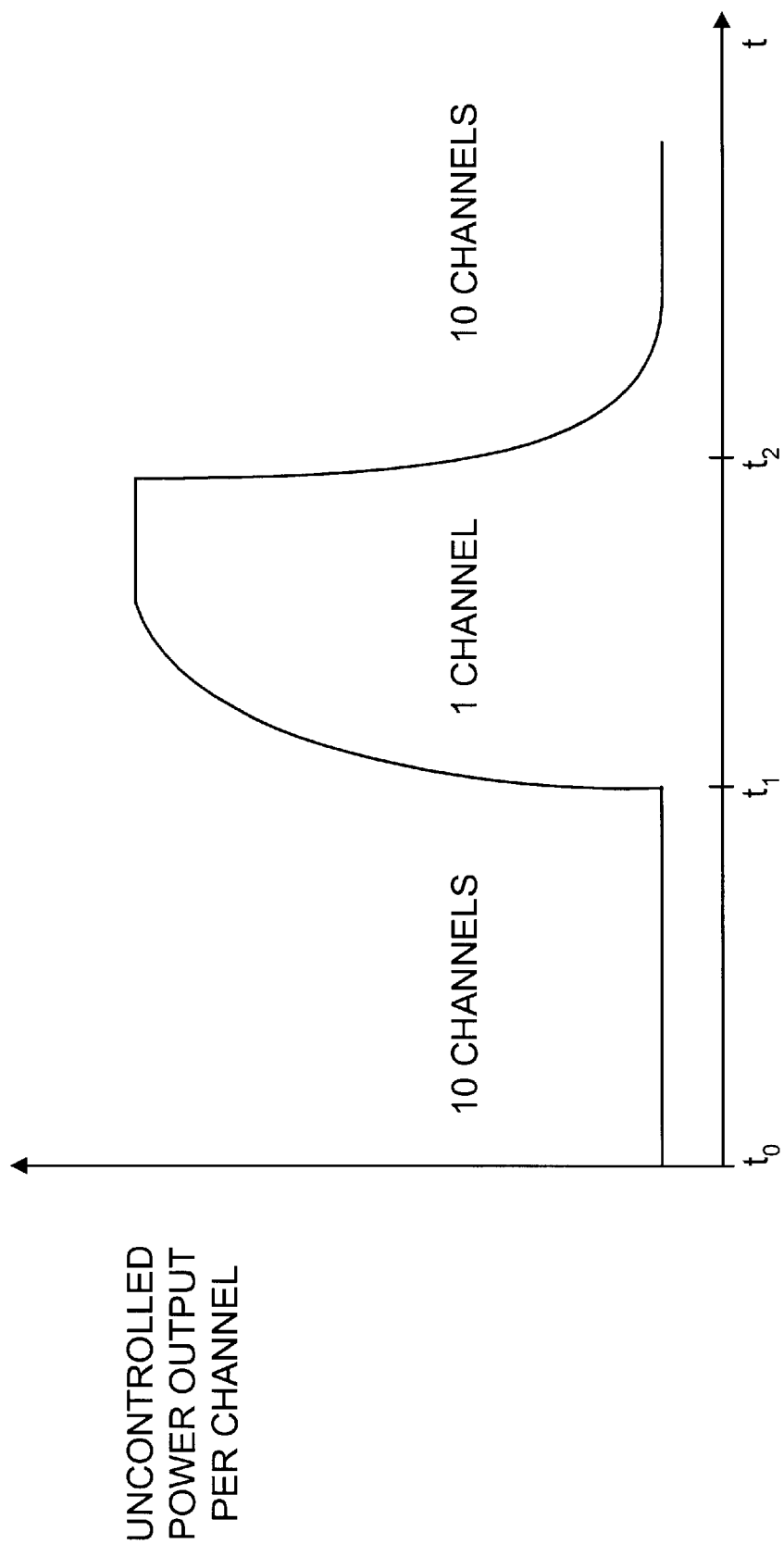
FIG. 3 is a graph showing the output power behavior of a fiber amplifier without transient control capabilities when the input power changes as shown in FIG. 2.

An erbium-doped fiber amplifier with a constant pump level will not produce a well-controlled output signal in response to such large variations in the input signal level. The output power per channel from an amplifier without transient control when the amplifier receives an input signal of the type shown in FIG. 2 is shown in FIG. 3. At $t_1$, when 9 channels are dropped, the output power for the surviving channel begins to rise (with a time constant on the order of milliseconds), because the pump power (which has not changed) is too large. The overly-large pump power builds up an excessive level of inversion in the fiber coil, which significantly increases the gain experienced by the surviving channel. As a rough approximation, the gain for the surviving channel increases to 10 times its previous value. This causes the amplifier output power for the surviving channel to increase to approximately 10 times its original level. An amplifier with gain fluctuations of this type is generally unacceptable, because the output power in each channel varies too much under different input conditions.

A control technique that might be used to control the gain level in fiber amplifiers involves a feed-forward approach. With this approach, the power that is supplied to the pump sources in the amplifier is determined based on the measured unfiltered total input power to the amplifier. This technique allows the amplifier to anticipate the effect that a change in input power will have on the amplifier even before that effect is measured at the amplifier output.

Figure 4:
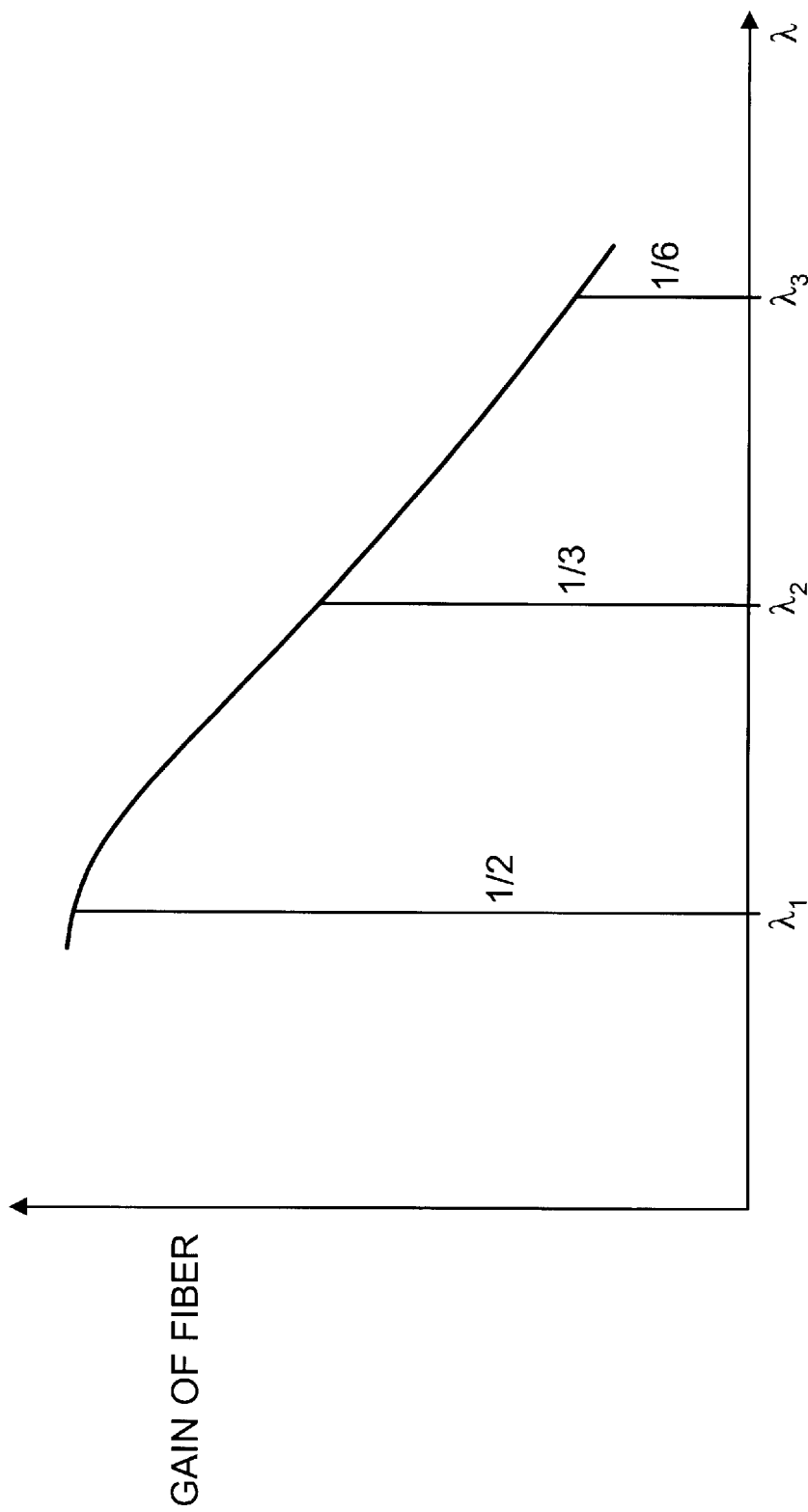
FIG. 4 is a graph showing a portion of a gain spectrum for an illustrative fiber amplifier coil in accordance with the present invention.
Figure 5:
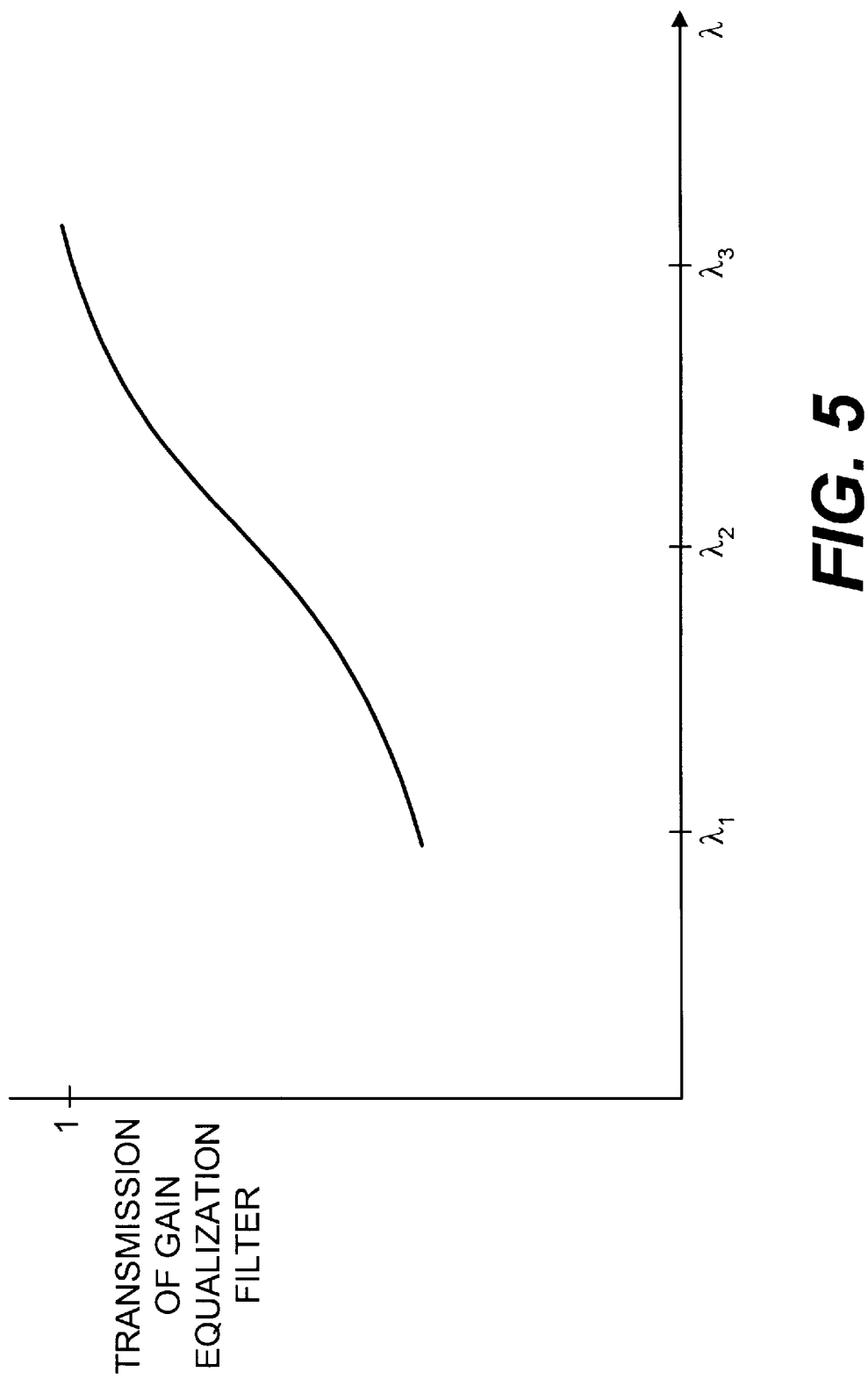
FIG. 5 is a graph showing a portion of the transmission spectrum of an illustrative gain equalization filter in accordance with the present invention.

However, feed-forward approaches based on unfiltered input power measurements are not able to control amplifier gain accurately in systems in which the gain of the amplifier's fiber coils is not spectrally flat. This is illustrated in FIGS. 4–9. An illustrative portion of a typical doped-fiber gain spectra is shown in FIG. 4. In the example of FIG. 4, the gain experienced by a signal at wavelength $\lambda_1$ is ½ (in arbitrary units), the gain experienced by a signal at wavelength $\lambda_2$ is ⅓ (in arbitrary units), and the gain experienced by a signal at wavelength $\lambda_3$ is ⅙ (in arbitrary units). In order to flatten the gain of an amplifier that uses the fiber of FIG. 4, a complementary gain equalization filter may be placed in series with the amplifying fiber coil. An illustrative transmission spectrum for a gain equalization filter that could be used to compensate for the gain spectrum of FIG. 4 is shown in FIG. 5. As shown in FIG. 5, the gain equalization filter transmits light at $\lambda_3$ without attenuation, but attenuates light at $\lambda_1$ and $\lambda_2$ to compensate for the larger gain experienced by these wavelengths in the fiber coil of the amplifier.

Figure 6:
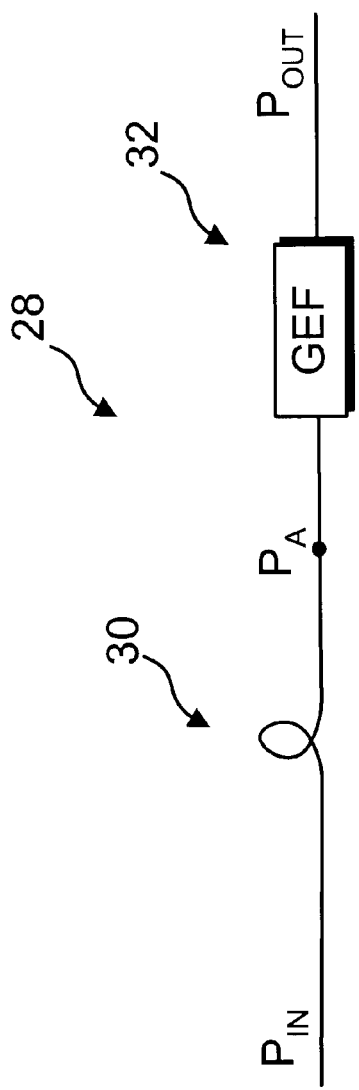
FIG. 6 is a simplified schematic diagram of a fiber amplifier having a fiber coil with a gain spectrum of the type shown in FIG. 4 and having a gain equalization filter with a transmission spectrum of the type shown in FIG. 5.

A simplified diagram of a fiber amplifier 28 having a fiber coil 30 with the gain spectrum of FIG. 4 and a gain equalization filter 32 with the transmission spectrum of FIG. 5 is shown in FIG. 6. With a feed-forward approach, input power ($P_{IN}$) is measured without spectral filtering and is used to control the pump power supplied to coil 30. The power in the fiber between coil 30 and gain equalization filter 32 has a power $P_A$. After the gain equalization filter, the output power of the amplifier is $P_{OUT}$.

A channel dropping scenario that illustrates the problem associated with using the feed-forward control approach in fiber amplifiers of the type shown in FIG. 6 is described below in connection with the tables of FIGS. 7–9. Initially, as shown in the table of FIG. 7, the three wavelengths shown in FIGS. 4 and 5 are carried by the system. Channel 1 uses wavelength $\lambda_1$, channel 2 uses wavelength $\lambda_2$, and channel 3 uses wavelength $\lambda_3$. The input power for all three channels is the same, but due to the gain spectrum of FIG. 4, the power $P_A$ is greatest for channel 1 and is lowest for channel 3. The transmission of the gain equalization filter is selected to equalize for the differences in the power $P_A$. Accordingly, in the configuration of FIG. 7 in which all three channels are being carried, the output power for each channel is the same (⅙ W).

If channels 2 and 3 are dropped, as shown in the table of FIG. 8, the input power to the system is ⅓ of its original value (i.e., 0.01 W rather than 0.03 W). Using the feed-forward methodology, the pump power is therefore reduced to ⅓ of its original level. If amplifier 28 is in saturation, all of the gain in the amplifier is experienced by the signal on channel 1, so that the output power of coil 30 ($P_A$) is ⅓ W. After the gain equalization filter 32, the output power for channel 1 is ⅙ W.

If, instead, channels 1 and 2 are dropped, as shown in the table of FIG. 9, the channel 3 signal experiences all of the gain of the amplifier. The pump power is reduced to ⅓ of its initial value based on the measured input power drop using the feed-forward approach. Accordingly, the channel 3 signal after coil 30 ($P_A$) is ⅓ W. Because the transmission factor for the gain equalization filter 32 is 1 (100%) at the channel 3 wavelength (as opposed to ⅓ at the channel 1 wavelength), the output power for channel 3 is ⅓ W.

Thus in the dropped-channel scenario of FIG. 8, an input power of 0.01 W is amplified to an output power of ⅙ W, whereas in the dropped-channel scenario of FIG. 9, an input power of 0.01 W is amplified to an output power of ⅓ W. In this example, a flat gain spectrum was desired. The channel-to-channel variability that results from basing the control scheme on the measured total input power therefore represents a significant variability in the gain performance of the amplifier and is generally unacceptable.

In accordance with the present invention, an input power tap arrangement may be used that has a spectral filter. The spectral filter may be matched to the gain spectrum of the amplifier's gain medium. Using a spectral filter that is matched to the gain spectrum of the amplifier's gain medium may eliminate the problems associated with using feed-forward approaches in amplifiers with wavelength-dependent gain mediums. Using a spectral filter that is matched to the gain spectrum of the amplifier's gain medium may also increase transient control accuracy in amplifiers that use hybrid control schemes based on both feed-forward and feedback control techniques.

Figure 10:
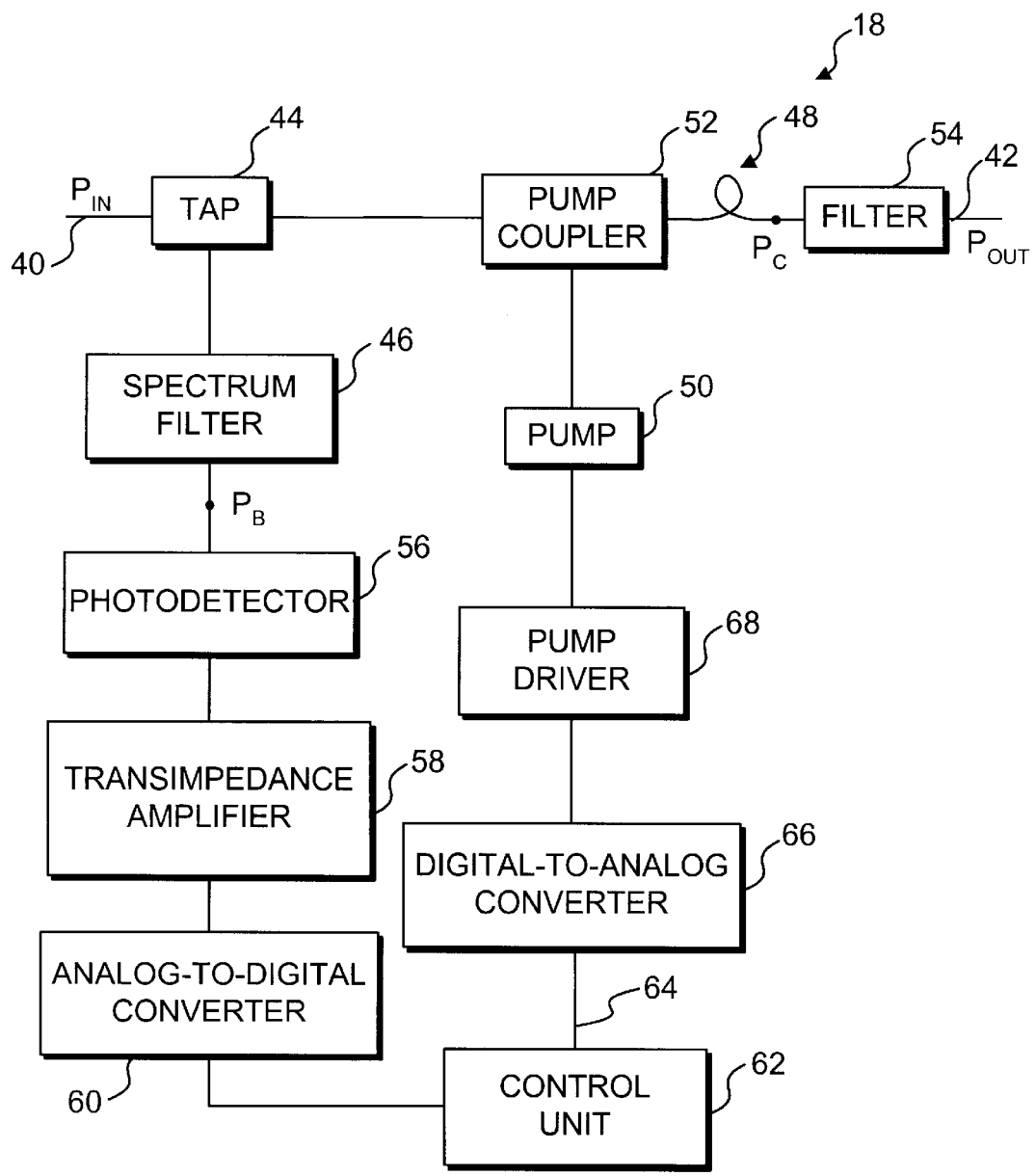
FIG. 10 is a schematic diagram of an illustrative amplifier having a spectrum filter for filtering tapped optical input signals for use in a feed-forward-based control scheme in accordance with the present invention.

An illustrative amplifier 18 having an input power tap filter arrangement is shown in FIG. 10. The amplifier 18 of FIG. 10 is somewhat simplified to avoid over-complicating the drawing. For example, amplifier 18 of FIG. 10 has only a single gain stage. This is merely illustrative. Amplifier 18 may have multiple gain stages (e.g., multiple rare-earth-doped or erbium-doped fiber coils). Amplifiers such as amplifier 18 may also have additional components such as variable optical attenuators, dispersion compensating fiber, telemetry channel filters, filters such as gain equalization filters, isolators, pumps, taps, etc.

As shown in FIG. 10, input signals may be provided to amplifier 18 at input fiber 40. Amplified output signals are provided at output fiber 42. A tap 44 (e.g., a 2%/98% tap) may be used at the input to amplifier 18 to measure an optical signal that is directly proportional to the input power ($P_{IN}$). The tapped (2%) signal is spectrally-filtered by spectrum filter 46. The transmission spectrum of filter 46 matches (or at least roughly approximates) the unflattened gain spectrum of the gain medium in amplifier 18. In the example of FIG. 10, gain is provided by a fiber coil 48. Fiber coil 48 may be, for example, a rare-earth-doped fiber such as an erbium-doped fiber. In this situation, the transmission spectrum of spectrum filter 46 may be selected to match the gain spectrum of the erbium-doped fiber coil.

Fiber coil 48 may be pumped by pump 50. Light from pump 50 may be coupled into coil 48 by pump coupler 52. Pump 50 may be any suitable source of pump light such as one or more laser diodes operating at, for example, 980 nm or 1480 nm or other suitable wavelengths. Pump coupler 52 may be any suitable pump coupler such as a wavelengthdivision-multiplexing (WDM) coupler. If desired, a circulator arrangement may be used to couple pump light into coil 48.

Input signals from input 40 pass through tap 44 and pump coupler 52. These input signals are amplified in coil 48. The gain spectrum of coils such as coil 48 will typically not match the design requirements for the overall amplifier gain without modification. For example, it may be desired for amplifier 18 to have a flat gain spectrum, whereas the gain spectrum of coil 48 may have a significant peak. Accordingly, a spectrum filter 54 may be used to modify the gain spectrum of the amplifier. In the present example, filter 54 may be assumed to be a gain equalization filter (gain flattening filter) that flattens the output spectrum from coil 48, so the amplified signals on different channels are equal in magnitude when they reach output 42.

The spectrally-filtered input power signal at the output of spectrum filter 46 ($P_B$) may be converted into an electrical signal by photodetector 56. Transimpedance amplifier 58 may be used to convert current signals from photodetector 56 into voltage signals for analog-to-digital converter 60. Control unit 62 receives digital signals from analog-to-digital converter 60 for processing.

Control unit 62 may be based on any suitable control electronics such as one or more microprocessors, microcontrollers, digital signal processors, programmable logic devices, application-specific integrated circuits, etc.

Control unit 62 may process the spectrally-filtered input power information received from analog-to-digital converter 60 and may produce a corresponding digital pump control signal at output 64. The pump control signal may be converted into an analog control signal using digital-to-analog converter 66. The analog control signal from digital-to-analog converter 66 may be strengthened into a drive signal for pump 50 using pump driver 68.

The transmission spectrum of the input power spectrum filter matches (exactly or approximately) the gain spectrum of the gain medium in amplifier 18. In the example of FIG. 10, the transmission spectrum of spectrum filter 46 matches (exactly or approximately) the gain spectrum of fiber coil 48.

Figure 11:
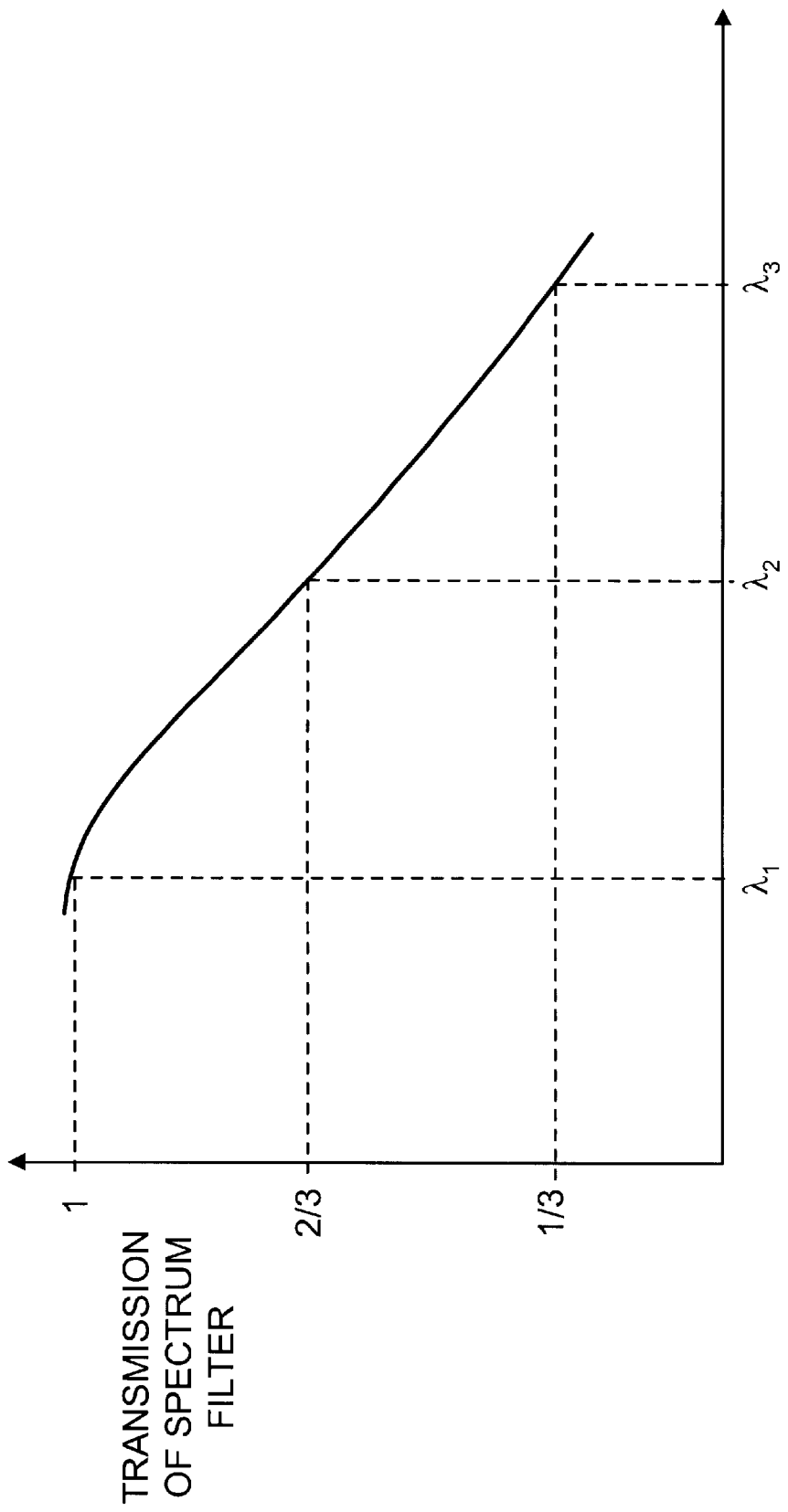
FIG. 11 is a graph showing a portion of the transmission spectrum of an illustrative spectrum filter for filtering input signals in accordance with the present invention.

A portion of the transmission spectrum of an illustrative spectrum filter 46 is shown in FIG. 11. In this example, the transmission spectrum shown in FIG. 11 matches (i.e., is directly proportional to) the gain spectrum of the fiber coil 48 that is shown in FIG. 4.

Spectrum filter 46 impresses the spectral characteristics of coil 48 onto the input power signals. This allows the measured filtered input power $P_B$ to be used in controlling the output power $P_C$ from coil 48. In particular, the pump power applied to coil 48 by pump 50 ($P_{PUMP-FF}$) can be made to track the input power measured by photodetector 56 ($P_B$), as shown in equation 1.

$$P_{PUMP-FF} = a\, P_B + b \tag{1}$$

The fitting constants "a" and "b" may be determined experimentally. The value of $P_B$ depends on both the power of the input signal $P_{IN}$ and the spectrum of the input signal.

The functional form of equation 1 is merely one suitable functional form that may be used to express feed-forward pump power as a function of spectrally-filtered input power. Other functional forms may be used if desired. For example, a second-order or higher-order functional form may be used.

The control scheme of equation 1 is a feed-forward approach in which spectral filtering is applied to the input power. This scheme may be implemented using control unit 62 of FIG. 10.

An illustrative example showing how the amplifier of FIG. 10 may respond to input power transients when using the control scheme of equation 1 is shown in FIGS. 12–15. In this set of examples, illustrative channels 1, 2, and 3 are supplied to input 40. Each channel has an input power of 0.01 W. As with the unfiltered feed-forward example of FIGS. 7–9, channel 1 operates at $\lambda_1$, channel 2 operates at $\lambda_2$, and channel 3 operates at $\lambda_3$.

Initially, all three channels are carried by the system. As shown in the table of FIG. 12, the input power for all three channels is the same (0.01 W), but due to the illustrative portion of the gain spectrum of coil 48 shown in FIG. 4, the amplified power $P_C$ per channel at the output of coil 48 is greatest for channel 1 and is lowest for channel 3. The transmission of the filter 54 (illustrated by the portion of the transmission spectrum shown in FIG. 5) may be selected to equalize for the channel-to-channel differences in the power $P_C$. Accordingly, when all three channels are being carried, the output power at output 42 may be the same (⅙ W) for each channel.

Spectrum filter 46 modifies the input power spectrum, so that the measured input powers $P_B$ for each channel are proportional to the output power $P_C$ for each channel at the output of coil 48. This allows control unit 62 to control the pump power produced at pump 50 based on the measured total power $P_B$.

For example, if channels 2 and 3 are dropped, as shown in the table of FIG. 13, the filtered input power $P_B$ to the system is ½ of its original value (i.e., 0.01 W rather than 0.02 W). The measured spectrally-filtered input power $P_B$ for the surviving channel (channel 1) is 0.01 W, because the transmission of spectrum filter 46 is 1 at $\lambda_1$, as shown in FIG. 11. Control unit 62 senses that the power $P_B$ has dropped to ½ of its original value, so control unit 62 reduces the pump power of pump 50 to ½ of its previous value in accordance with equation 1. This reduces the total output power $P_C$ to ½ W. If amplifier 18 is operating in saturation, the total amount of this output power will be used to amplify the surviving channel (channel 1). As shown in the table of FIG. 13, the output power $P_C$ for channel 1 is therefore ½ W. Filter 54 (which has the illustrative transmission spectrum of FIG. 5) reduces the output power from ½ W to ⅙ W at output 42. The output power on channel 1 after channels 2 and 3 have been dropped (⅙ W) is therefore the same as it was before channels 2 and 3 were dropped.

Another input power transient scenario is illustrated in FIG. 14. Initially, all three channels are being amplified by amplifier 18 (as shown in FIG. 12). If channels 1 and 3 are dropped, as shown in the table of FIG. 14, the filtered input power $P_B$ to the system drops to ⅓ of its original value (i.e., 0.0067 W rather than 0.02 W). The measured spectrally-filtered input power $P_B$ for the surviving channel (channel 2) is 0.0067 W, because the transmission of spectrum filter 46 is ⅔ at $\lambda_2$, as shown in FIG. 11. Control unit 62 senses that the power $P_B$ has dropped to ⅓ of its original value, so control unit 62 reduces the pump power of pump 50 to ⅓ of its previous value in accordance with equation 1. This reduces the total output power $P_C$ to ⅓ W. If amplifier 18 is operating in saturation, the total amount of this output power will be used to amplify the surviving channel (channel 2). As shown in the table of FIG. 14, the output power $P_C$ for channel 2 is therefore ⅓ W. Filter 54 (which has the illustrative transmission spectrum of FIG. 5) reduces the output power from ⅓ W to ⅙ W at output 42. The output power on channel 2 after channels 1 and 3 have been dropped (⅙ W) is therefore the same as it was before channels 1 and 3 were dropped.

The response of amplifier 18 to an input transient scenario in which channels 1 and 2 are dropped is shown in the table of FIG. 15. Initially, all three channels are being amplified by amplifier 18 (as shown in FIG. 12). If channels 1 and 2 are dropped, as shown in the table of FIG. 15, the filtered input power $P_B$ to the system drops to ⅙ of its original value (i.e., 0.0033 W rather than 0.02 W). The measured spectrally-filtered input power $P_B$ for the surviving channel (channel 3) is 0.0033 W, because the transmission of spectrum filter 46 is ⅓ at $\lambda_3$, as shown in FIG. 11. Control unit 62 senses that the power $P_B$ has dropped to ⅙ of its original value, so control unit 62 reduces the pump power of pump 50 to ⅙ of its previous value in accordance with equation 1. This reduces the total output power $P_C$ to ⅙ W. If amplifier 18 is operating in saturation, the total amount of this output power will be used to amplify the surviving channel (channel 3). As shown in the table of FIG. 15, the output power $P_C$ for channel 3 is therefore ⅙ W. Filter 54 (which has the illustrative transmission spectrum of FIG. 5) passes the full output power $P_C$ (⅙ W) on channel 3 to output 42, so the power at output 42 is ⅙ W. The final output power of amplifier 18 on channel 3 after channels 1 and 2 have been dropped (⅙ W) is therefore the same as it was before channels 1 and 2 were dropped.

Figure 16:
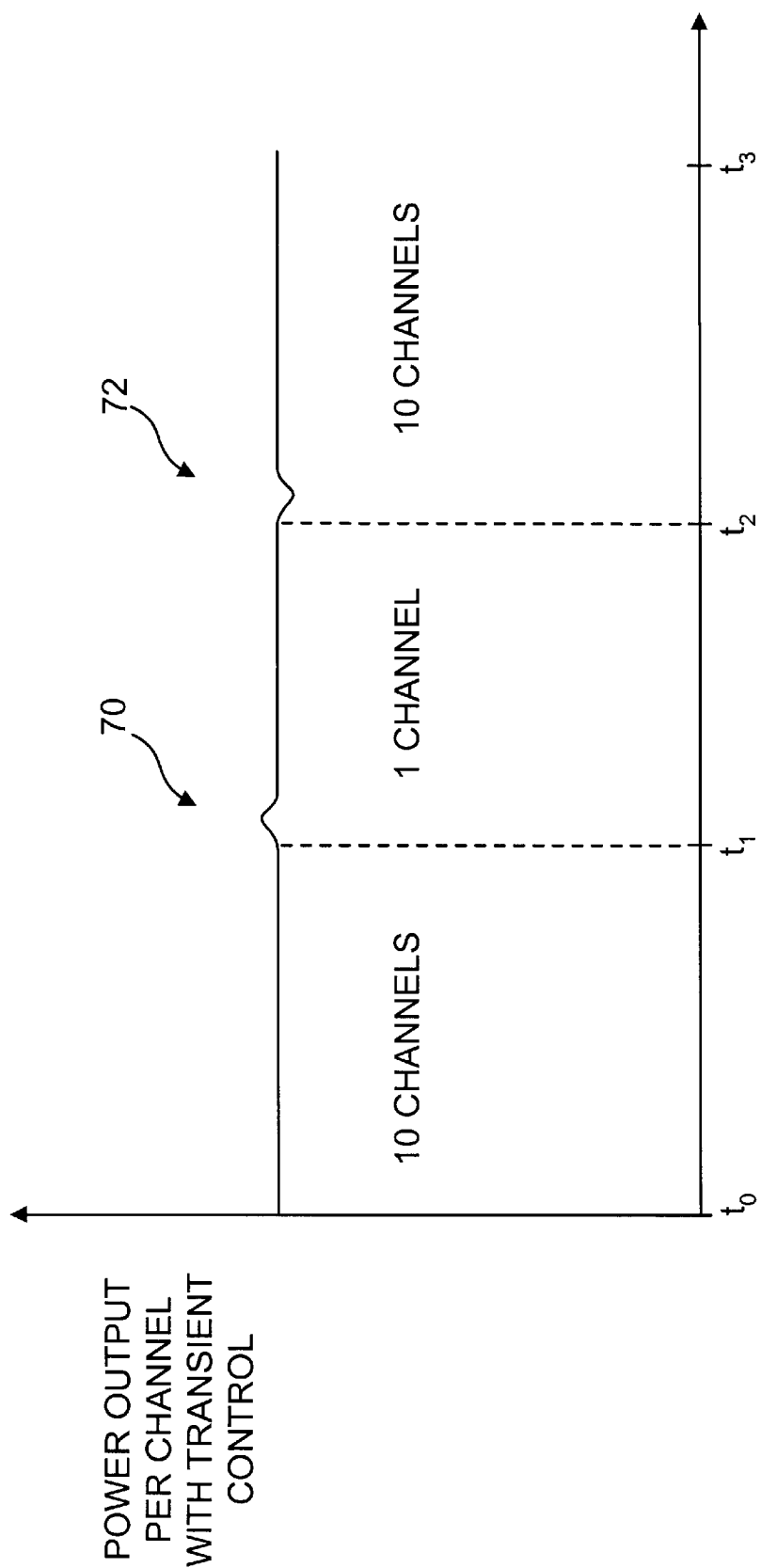
FIG. 16 is a graph showing an illustrative output from an amplifier such as the amplifier of FIG. 10 under transient input power conditions in accordance with the present invention.

A graph showing the consistency of the output power per channel for an amplifier of the type shown in FIG. 10 is shown in FIG. 16. Initially, between time $t_0$ and $t_1$, the amplifier is handling ten channels. At time $t_1$, nine of the channels are dropped. A small transient 70 in the output power may be produced, but the transient control scheme used by amplifier 18 significantly limits the magnitude of the transient. A similarly small transient 72 may be produced when transitioning from one channel to ten channels at time $t_2$.

By using a spectrum filter to modify the measured input signals to the amplifier, feed-forward control techniques may be used to reduce output power transients in the amplifier due to fluctuations in input power. The spectral shape of the spectrum filter should be approximately or exactly matched to the spectral shape of the amplifier's gain medium. In erbium-doped fiber amplifiers, for example, the spectral shape of the spectrum filter should be matched to the gain spectrum of the erbium-doped fiber coils. The overall gain spectrum of the amplifier typically differs from the gain spectrum of the gain medium. For example, the overall gain spectrum of the amplifier may be flat, whereas the gain spectrum of a gain media may vary considerably. In general, if the spectrum filter shape matches the spectrum of the gain medium, transients may be well controlled regardless of whether the input signal powers are uniform from channel to channel or whether the overall gain of the amplifier is flat. Transients may be controlled even if the input signal powers vary from channel to channel and the overall gain of the amplifier is tilted or is otherwise not flat.

Figure 17:
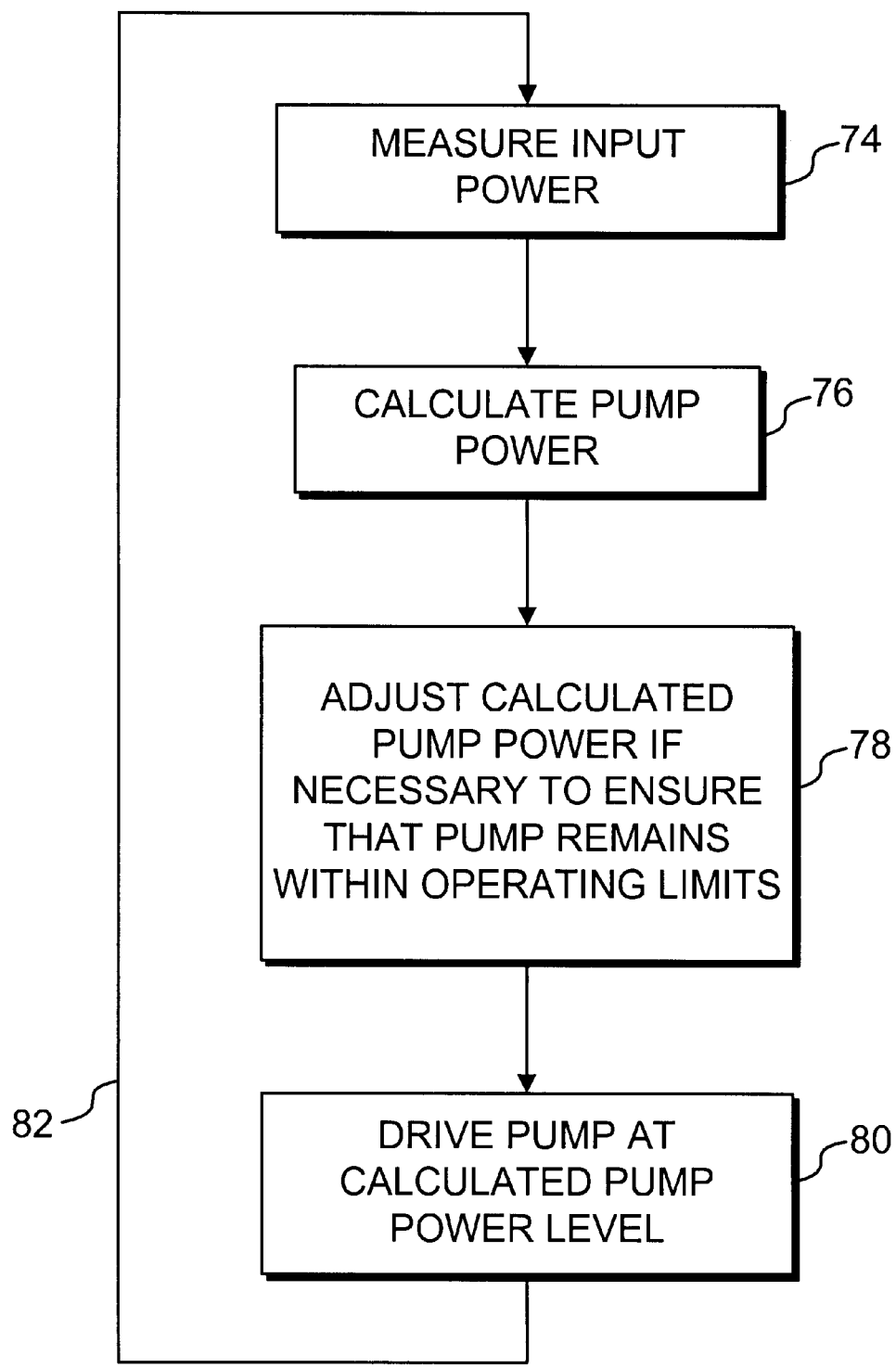
FIG. 17 is a flow chart of illustrative steps involved in providing transient control with the amplifier of FIG. 10 in accordance with the present invention.

Illustrative steps involved in controlling amplifier transients in an optical amplifier such as the optical amplifier of FIG. 10 using the transient control technique described in connection with FIGS. 12–15 are shown in FIG. 17. The steps of FIG. 17 may be performed in a continuous loop.

At step 74, the amplifier may measure the input power using tap 44. Spectrum filter 46 modifies the input power spectrum. The spectrally-filtered input power may be measured by photodetector 56.

Control unit 62 may calculate the appropriate pump power at step 76 using equation 1, as described in connection with FIGS. 12–15. This is a feed-forward scheme in which the signal that is used to control the pump settings is based on the spectrally-filtered input power ($P_B$).

At step 78, control unit 62 may adjust the calculated pump power if necessary to ensure that the pump is operated within normal operating limits. For example, if the calculated pump power value is below the minimum required to ensure that the lasing threshold of pump 50 is surpassed, the calculated pump power may be raised to the lasing threshold value. If the calculated pump power value is above the maximum safe operating limit of pump 50, the calculated pump power may be lowered to ensure that the pump is not damaged.

At step 80, pump 50 may be driven at the calculated pump power level by supplying an appropriate drive signal to pump 50 using control unit 62, digital-to-analog converter 66, and pump driver 68.

As shown by line 82, after step 80 is completed, steps 74, 76, 78, and 80 are repeated. The loop speed is determined by the capabilities of the control electronics. In general, the control electronics should be selected to operate as rapidly as possible within cost constraints.

If desired, spectral filtering may be used to modify the tapped output power of amplifier 18. This allows feedback-based transient control techniques to be used, even if the overall gain of the amplifier is not spectrally flat.

Amplifiers with gains that are not flat may be used in various different types of communications links. For example, amplifiers with gains that are not flat may be used in fiber-optic systems with Raman-assisted gain. In such a system, a transmission fiber span such as one of spans 16 may be Raman-pumped to reduce attenuation losses. The Raman gain provided by such an arrangement is typically not spectrally flat. The Raman gain in the transmission fiber may therefore cause the signal powers for channels at different wavelengths to be amplified by different amounts. As a result, the input powers to the amplifier may not be equal for different channels. The amplifier in such a system may be configured to have a gain spectrum that tends to equalize the unequal input powers associated with the different channels. This may make the output power spectrum of the amplifier flat.

As another example, amplifiers may have gains that are not flat in situations in which it is desired to produce a constant signal-to-noise ratio across channels. This may involve increasing the signal strength for channels at longer wavelengths to compensate for higher noise levels at those wavelengths. The gain of such an amplifier may therefore be tilted so that the gain at longer wavelengths is greater than the gain at shorter wavelengths.

For these and other reasons, it may be desirable to provide an amplifier with a non-flat gain. A spectrum filter with a spectral shape that flattens the overall gain spectrum of the amplifier may be used to filter the tapped output power of the amplifier (or an equivalent combination of filters may be used to filter the tapped input and output powers of the amplifier). The filtered power measurements may be used in a feedback control arrangement to calculate a modified version of the amplifier gain. Maintaining the modified version of the amplifier gain at a constant level allows the non-flat gain of the amplifier to be stabilized, even when the amplifier is subjected to input power transients.

Figure 18:
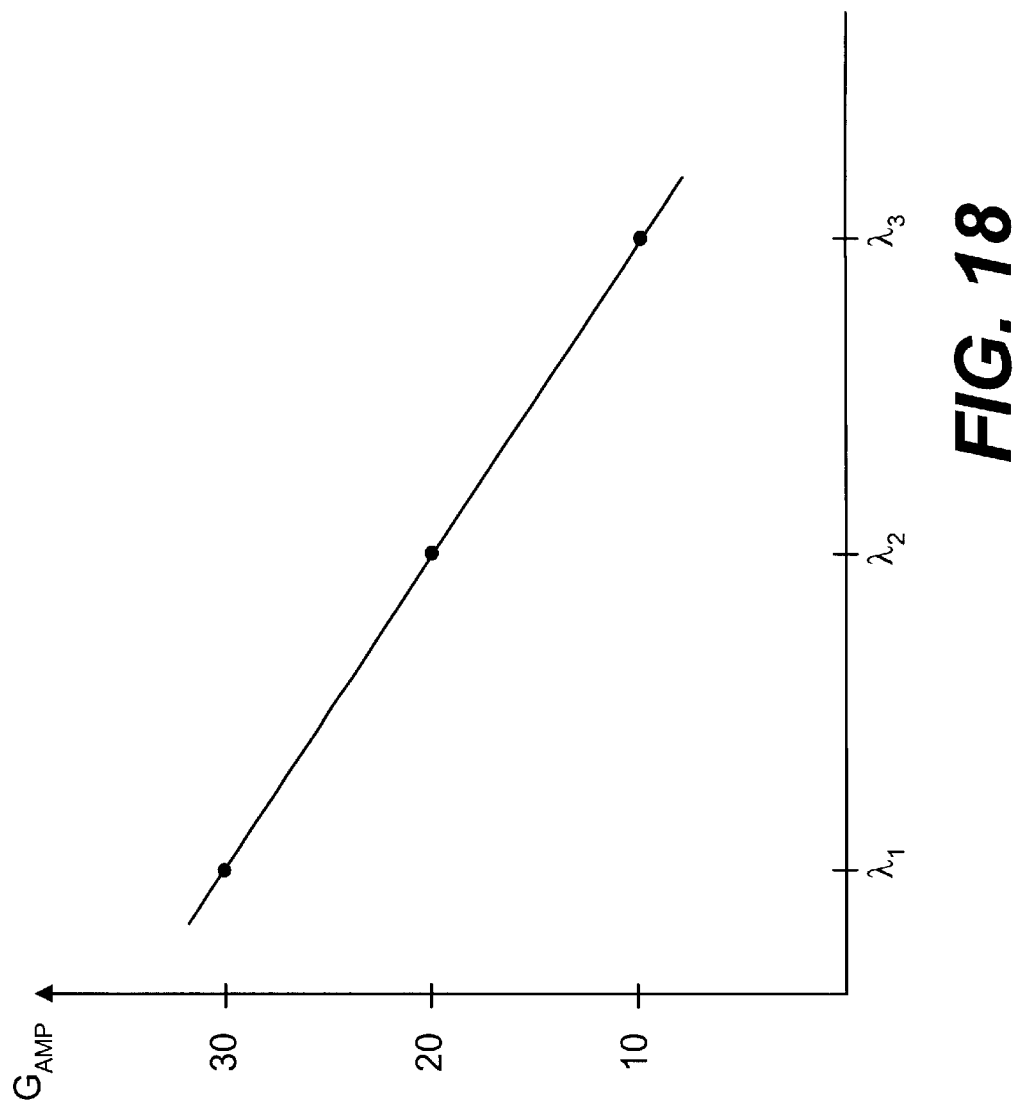
FIG. 18 is a graph showing a portion of an illustrative amplifier gain spectrum that is not flat in accordance with the present invention.

A channel dropping scenario that illustrates the problem associated with using feedback-based control approaches without spectral filtering to control fiber amplifier gain transients is described below in connection with FIGS. 18–20. The gain spectrum of an illustrative amplifier with a non-flat gain is shown in FIG. 18. The gain spectrum of FIG. 18 is merely illustrative. In the example of FIG. 18, the gain at $\lambda_1$ is 30, the gain at $\lambda_2$ is 20, and the gain at $\lambda_3$ is 10.

Initially, as shown in the table of FIG. 19, the three wavelengths shown in FIG. 18 are carried by the system. Channel 1 uses wavelength $\lambda_1$, channel 2 uses wavelength $\lambda_2$, and channel 3 uses wavelength $\lambda_3$. The input power for all three channels is the same in this example, but due to the non-flat gain spectrum of the amplifier, the amplified output power is greatest for channel 1 and is lowest for channel 3. The total input power in the FIG. 19 example is 0.03 W and the total output power is 0.6 W. Accordingly, the total power gain when all three channels are operating is 20.

The result of using a feedback approach based on unfiltered power measurements that attempts to maintain the gain at a constant level (20) is shown in FIG. 20. As shown in the table of FIG. 20, if channels 2 and 3 are dropped, the output power of the amplifier will be adjusted until it reaches 0.2 W, because at this level the total output power (0.2 W) divided by the total input power (0.01 W) will be 20. However, this results in a significant variation in the output power for channel 1. In particular, the output power for channel 1 will drop from 0.3 W when all three channels are present to 0.2 W when channel 1 is the only channel present.

As demonstrated by the example of FIGS. 19 and 20, using unfiltered output power measurements as the sole source of amplifier transient control feedback information in situations in which the gain of the amplifier is not flat may result in significant variations in the gain experienced on individual channels, which is generally unacceptable.

Figure 21:
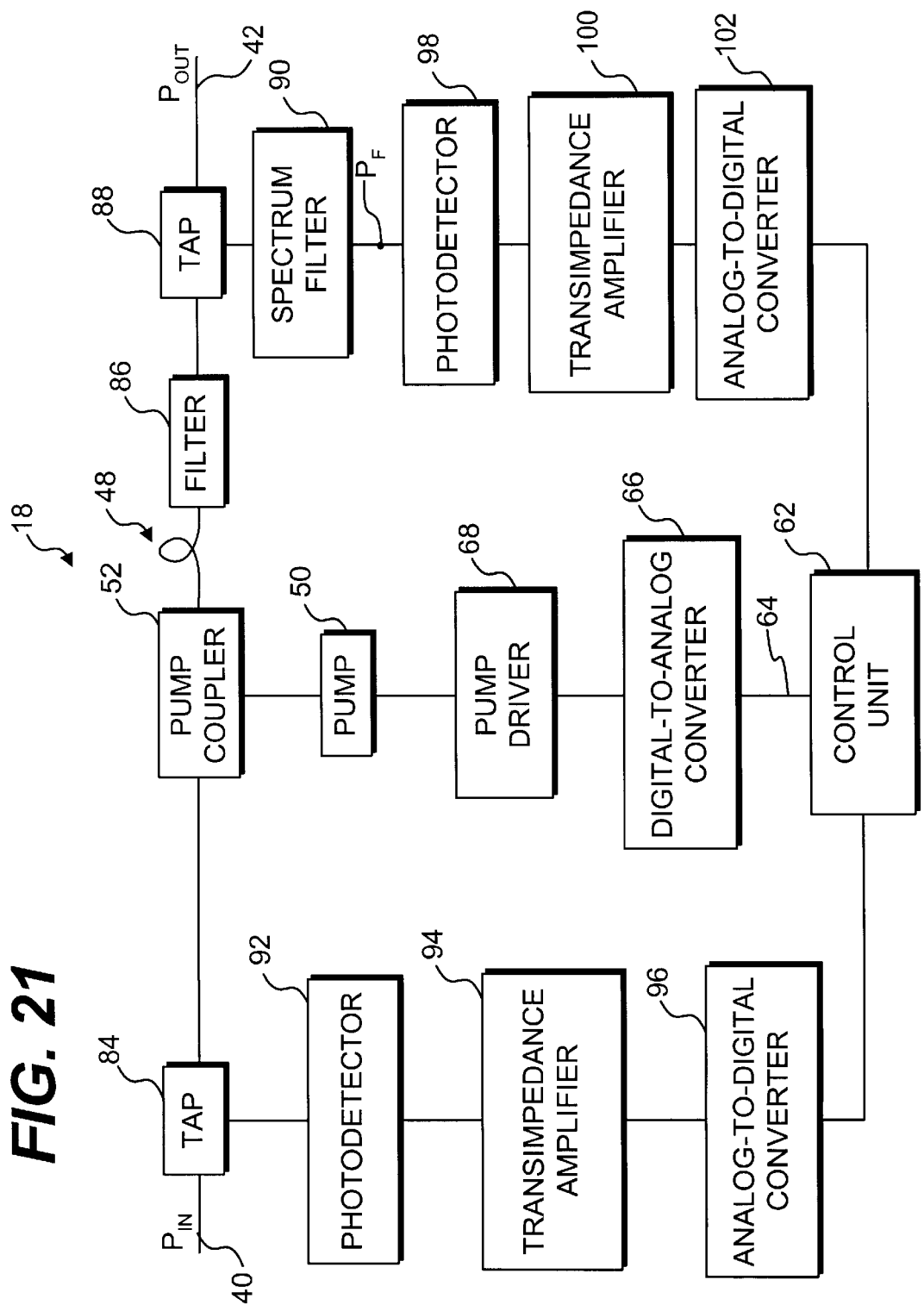
FIG. 21 is a schematic diagram of an illustrative amplifier having a spectrum filter for filtering tapped optical output signals for use in a feedback-based control scheme in accordance with the present invention.

An illustrative amplifier 18 with an output power tap spectral filtering arrangement that may be used in feedback-based transient control schemes is shown in FIG. 21. The amplifier 18 of FIG. 21 is somewhat simplified to avoid over-complicating the drawing. For example, amplifier 18 of FIG. 21 has only a single gain stage. This is merely illustrative. Amplifier 18 may have multiple gain stages (e.g., multiple rare-earth-doped or erbium-doped fiber coils). Amplifiers such as amplifier 18 may also have additional components such as variable optical attenuators, dispersion compensating fiber, telemetry channel filters, filters such as gain equalization filters, isolators, pumps, taps, etc.

As shown in FIG. 21, input signals may be provided to amplifier 18 at input fiber 40. Amplified output signals are provided at output fiber 42. A tap 84 (e.g., a 2%/98% tap) may be used at the input to amplifier 18 to measure an optical signal that is directly proportional to the input power ($P_{IN}$).

Fiber coil 48 may be pumped by pump 50. Light from pump 50 may be coupled into coil 48 by pump coupler 52. Pump 50 may be any suitable source of pump light such as one or more laser diodes operating at, for example, 980 nm or 1480 nm or other suitable wavelengths. Pump coupler 52 may be any suitable pump coupler such as a wavelength-division-multiplexing (WDM) coupler. If desired, a circulator arrangement may be used to couple pump light into coil 48.

Input signals from input 40 pass through tap 84 and pump coupler 52. These input signals are amplified in coil 48. The gain spectrum of coil 48 is generally not flat, so signals at different wavelengths may be amplified by different amounts. If coil 48 is an erbium-doped fiber coil, for example, the gain of coil 48 will have a characteristic erbium gain peak. A spectrum filter 86 may be used to modify the gain of the amplifier's gain medium. In the example of FIG. 21, the amplifier's gain medium is coil 48. Spectrum filter 86 may be used to produce any desired gain spectrum for amplifier 18. For example, spectrum filter 86 may be a gain equalization filter (gain flattening filter) that is used to flatten the output spectrum of the amplifier's gain medium, so the amplified signals on different channels are equal in magnitude when they reach the amplifier output. If desired, filter 86 may be used to modify the gain spectrum of coil 48 to produce an overall amplifier gain spectrum that is not flat, as illustrated by the portion of the illustrative amplifier gain spectrum that is shown in FIG. 18.

The output power of the amplifier $P_{OUT}$ may be monitored using a tap 88 (e.g., a 2%/98% tap). The tapped (2%) signal from tap 88 may be spectrally-filtered by spectrum filter 90. The transmission spectrum of filter 90 may be inversely proportional to the gain spectrum of amplifier 18. This allows the filter 90 to exactly or approximately flatten the overall gain spectrum of amplifier 18. Using filter 90 to flatten the tapped output power spectrum removes the spectral dependence of the amplifier gain from the control loop.

The tapped input power from tap 84 may be monitored using any suitable monitoring circuit. For example, the tapped input power from tap 84 may be monitored using a photodetector 92 that converts optical signals into analog current signals, a transimpedance amplifier 94 that converts the current signals into analog voltage signals, and an analog-to-digital converter 96 that converts the analog voltage signals into digital signals. The spectrally-filtered tapped output power from filter 90 may be monitored using any suitable monitoring circuit. For example, a monitoring circuit that includes photodetector 98, a transimpedance amplifier 100, and an analog-to-digital converter 102 may be used. These are merely illustrative monitoring circuits. Any suitable monitoring circuits may be used if desired.

Control unit 62 may receive digital signals from analog-to-digital converters 96 and 102 for processing. Control unit 62 may be based on any suitable control electronics such as one or more microprocessors, microcontrollers, digital signal processors, programmable logic devices, application-specific integrated circuits, etc.

Control unit 62 may process the monitored power signals in amplifier 18 and may produce a corresponding digital pump control signal at output 64. The pump control signal may be converted into an analog control signal using digital-to-analog converter 66. The analog control signal from digital-to-analog converter 66 may be strengthened into a drive signal for pump 50 using pump driver 68. By controlling the pump power provided to coil 48, the gain of the amplifier may be controlled.

A modified version of the gain of the amplifier may be monitored using the input signal from tap 84 and the spectrally-filtered output signal from filter 90. The amplifier may maintain this version of the measured gain at a constant value using feedback. With this approach, the gain for each channel of the amplifier remains constant even when the input of the amplifier experiences power transients. The results of using this type of approach are illustrated in the channel-dropping scenario of FIGS. 22–24. The scenario of FIGS. 22–24 illustrates the transient behavior of an amplifier of the type shown in FIG. 21 when the overall gain spectrum of the amplifier is as shown in FIG. 18.

In this set of examples, illustrative channels 1, 2, and 3 are supplied to input 40 of FIG. 21. Each channel has an input power of 0.01 W. Channel 1 operates at $\lambda_1$, channel 2 operates at $\lambda_2$, and channel 3 operates at $\lambda_3$. Initially, all three channels are carried by the system. As shown in the table of FIG. 22, the input power for all three channels is the same (0.01 W). The total input power is 0.03 W. Tap 84 and the associated monitoring circuitry of FIG. 21 may be used to monitor the total input power and to provide information on the monitored value of the total input power to control unit 62 as digital signals.

As shown in FIG. 22, the amplified power per channel at the output 42 of amplifier 18 ($P_{OUT}$) is greatest for channel 1 and is lowest for channel 3. However, the output powers $P_F$ that are measured after spectral filter 90 are spectrally-flattened. By ensuring that the power $P_F$ for each channel is the same, filter 90 eliminates the spectral dependence of the measured output power and allows the filtered output power measured by photodetector 98 to be used in a feedback control scheme.

A modified version of the gain of the amplifier ($G_{MODIFIED}$) may be calculated by control unit 62 by dividing the total spectrally-filtered output power $P_F$ by the total input power as shown by equation 2.

$$G_{MODIFIED} = P_F/P_{IN} \quad (2)$$

In the example of FIG. 22, $G_{MODIFIED}$ is 10 (0.3 W/0.03 W). Control unit 62 of FIG. 21 may be used to adjust the pump power of pump 50 ($P_{PUMP-FB}$) to maintain a constant level of $G_{MODIFIED}$.

To maintain a constant value for $G_{MODIFIED}$, a gain error parameter may be calculated using equation 3.

$$E = G_{MODIFIED} - G_{DESIRED} \quad (3)$$

In equation 3, $G_{DESIRED}$ is the desired (constant) gain for amplifier 18 and E is the gain error parameter. The gain error parameter E may be used by control unit 62 to calculate the feedback pump power $P_{PUMP-FB}$ for pump 50 to apply to coil 48 as shown in equation 4.

$$P_{PUMP-FB} = \alpha E + \beta \int E + \gamma E' \quad (4)$$

In equation 4, $\alpha$, $\beta$, and $\gamma$ are fitting parameters that may be determined experimentally. Equation 4 is based on the well-known proportional-integral-derivative (PID) method. This is merely an illustrative feedback control technique that may be used. Any other suitable feedback technique may be used to calculate the pump power if desired.

As shown in FIG. 23, when channels 2 and 3 are dropped, the total measured input power drops to 0.01 W. Control unit 62 maintains $G_{MODIFIED}$ at a constant level (10) using the control technique of equations 2–4, so that the output power $P_F$ for channel 1 is maintained at 0.1 W and the resulting output power for channel 1 is therefore maintained at 0.3 W.

Similarly, as shown in FIG. 24, if channels 1 and 3 are dropped, the total measured input power drops to 0.01 W. Control unit 62 maintains $G_{MODIFIED}$ at a constant level (10) using the control technique of equations 2–4, so that the output power $P_F$ for channel 2 is maintained at 0.1 W and the resulting output power for channel 2 is therefore maintained at 0.2 W.

As these examples illustrate, using feedback to maintain $G_{MODIFIED}$ at a constant value allows amplifier 18 to maintain a constant gain for each of the channels supported by the amplifier, even if the overall gain of the amplifier is not spectrally flat.

Figure 25:
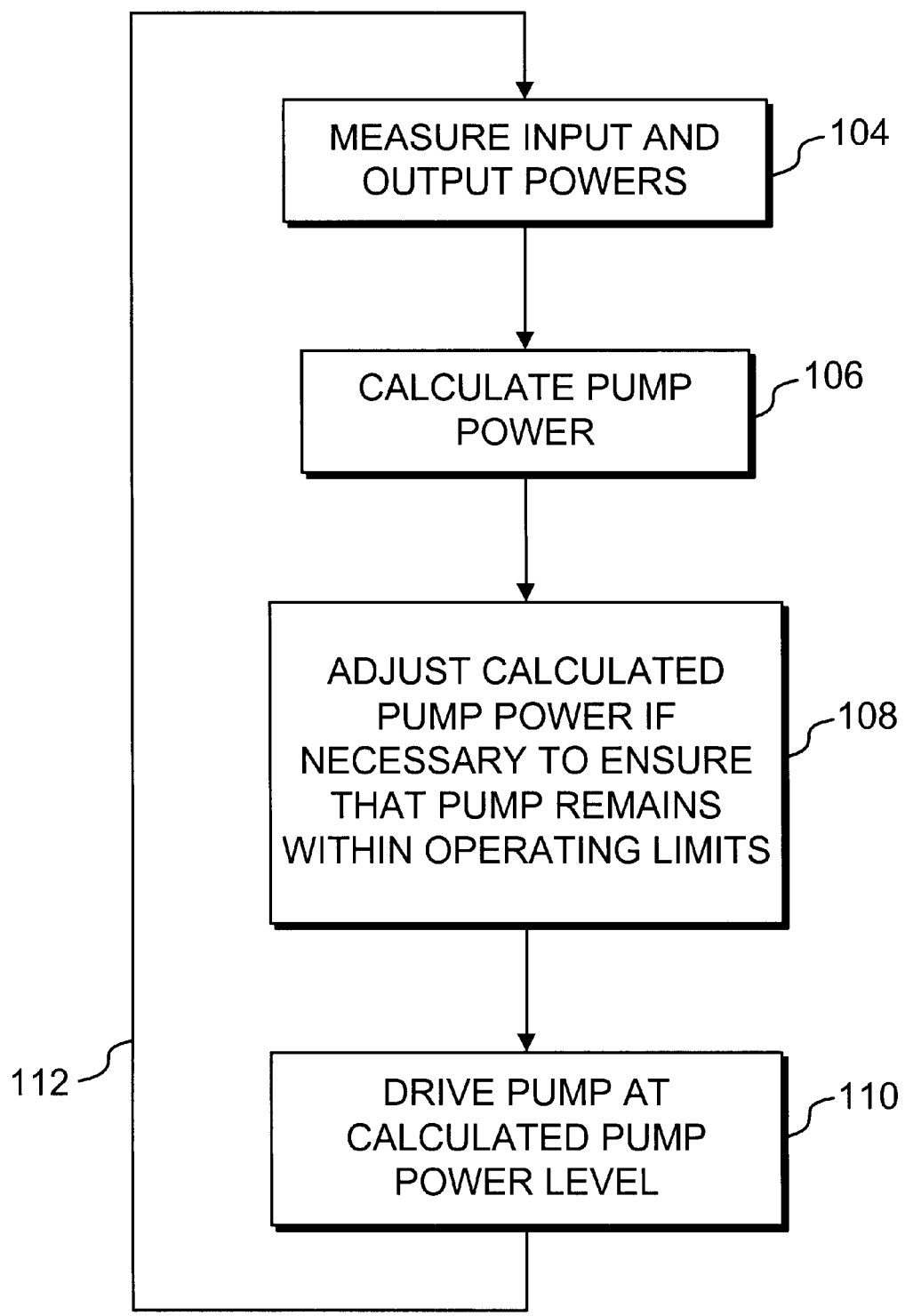
FIG. 25 is a flow chart of illustrative steps involved in providing transient control with an amplifier of the type shown in FIG. 21 in accordance with the present invention.

Illustrative steps involved in controlling amplifier transients in an optical amplifier such as the optical amplifier of FIG. 21 using the transient control technique described in connection with FIGS. 22–24 are shown in FIG. 25. The steps of FIG. 25 may be performed in a continuous loop. For example, steps 104, 106, 108, and 110 may all be performed once every 100 ns.

At step 104, the amplifier may measure the input and output powers using taps 84 and 88. A spectrum filter such as spectrum filter 90 may be used to flatten the measured output power spectrum.

At step 106, control unit 62 may calculate the appropriate pump power for pump 50 using equations 2–4, as described in connection with FIGS. 22–24. This is a feedback scheme in which the signal that is used to control the pump settings is based on a spectrally-modified version of the measured input and output powers.

At step 108, control unit 62 may adjust the calculated pump power if necessary to ensure that the pump is operated within normal operating limits. For example, if the calculated pump power value is below the minimum required to ensure that the lasing threshold of pump 50 of FIG. 21 is surpassed, the calculated pump power may be raised to the lasing threshold value. If the calculated pump power value is above the maximum safe operating limit of pump 50, the calculated pump power may be lowered to ensure that the pump is not damaged.

At step 108, pump 50 of amplifier 18 of FIG. 21 may be driven at the calculated pump power level by supplying an appropriate drive signal to pump 50 using control unit 62, digital-to-analog converter 66, and pump driver 68.

As shown by line 112, after step 110 is completed, steps 104, 106, 108, and 110 are repeated. The loop speed is determined by the capabilities of the control electronics. In general, the control electronics should be selected to operate as rapidly as possible within cost constraints.

Figure 26:
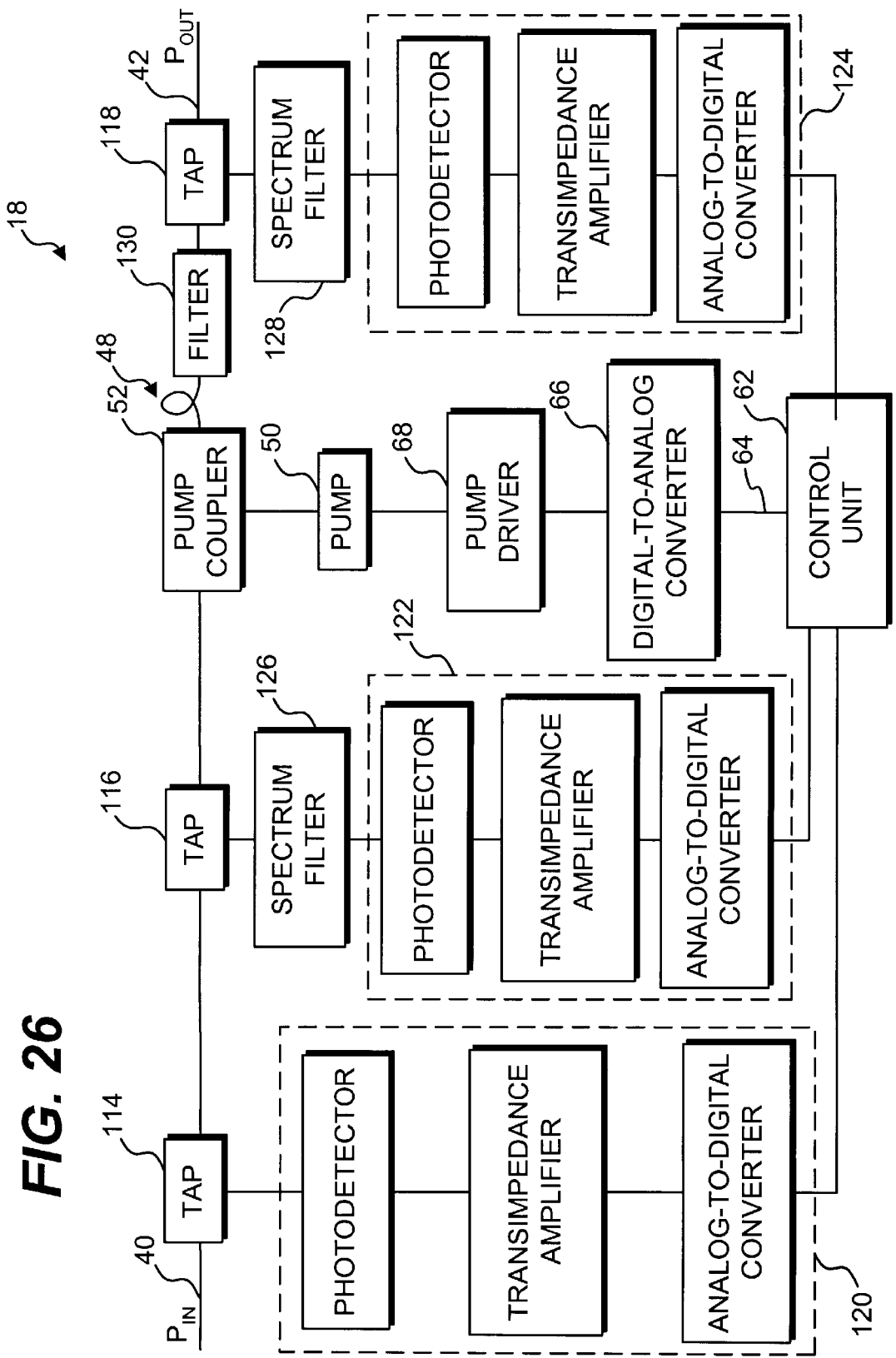
FIG. 26 is a schematic diagram of an illustrative amplifier having spectrum filters for filtering tapped optical input and output signals for use in a control scheme using feed-forward and feedback control techniques in accordance with the present invention.

If desired, a hybrid feed-forward and feedback amplifier control scheme may be used to control transients. An illustrative amplifier 18 with which a hybrid control scheme may be used is shown in FIG. 26. The amplifier 18 of FIG. 26 is somewhat simplified to avoid over-complicating the drawing. For example, amplifier 18 of FIG. 26 has only a single gain stage. This is merely illustrative. Amplifier 18 may have multiple gain stages (e.g., multiple rare-earth-doped or erbium-doped fiber coils). Amplifiers such as amplifier 18 may also have additional components such as variable optical attenuators, dispersion compensating fiber, telemetry channel filters, filters such as gain equalization filters, isolators, pumps, taps, etc.

As shown in FIG. 26, input signals may be provided to amplifier 18 at input fiber 40. Amplified output signals are provided at output fiber 42. A tap 114 (e.g., a 2%/98% tap) may be used at the input to amplifier 18 to measure an optical signal that is directly proportional to the input power ($P_{IN}$). A tap 116 (e.g., a 2%/98% tap) may also be used at the input to amplifier 18 to measure an optical signal that is directly proportional to the input power ($P_{IN}$). A tap 118 (e.g., a 2%/98% tap) may be used at the output of amplifier 18 to measure an optical signal that is directly proportional to the output power ($P_{OUT}$).

The signal from tap 114 may be monitored by monitor 120. Monitor 120 and monitors 122 and 124 may each have a photodetector for converting optical signals into current signals, a transimpedance amplifier for converting current signals from the photodetector into voltage signals, and an analog-to-digital converter for converting analog voltage signals from the transimpedance amplifier into digital signals for control unit 62. If desired, other suitable monitor circuits may be used.

The signal from tap 116 may be spectrally-filtered by spectrum filter 126. The transmission spectrum of filter 126 may be selected to match (or at least roughly approximate) the gain spectrum of the gain medium in amplifier 18. In the example of FIG. 26, gain is provided by a fiber coil 48. Fiber coil 48 may be, for example, a rare-earth-doped fiber such as an erbium-doped fiber. In this situation, the transmission spectrum of spectrum filter 126 may be selected to match the gain spectrum of the erbium-doped fiber coil. Signals from spectrum filter 126 may be monitored using monitor 122.

The signal from tap 118 may be spectrally-filtered by spectrum filter 128. The transmission spectrum of filter 128 may be selected to flatten the overall gain spectrum of amplifier 18. In particular, the transmission spectrum of filter 128 may be exactly or approximately inversely proportional to the gain spectrum of amplifier 18. Signals from spectrum filter 128 may be monitored using monitor 124.

Fiber coil 48 of amplifier 18 of FIG. 26 may be pumped by pump 50. Light from pump 50 may be coupled into coil 48 by pump coupler 52. Pump 50 may be any suitable source of pump light such as one or more laser diodes operating at, for example, 980 nm or 1480 nm or other suitable wavelengths. Pump coupler 52 may be any suitable pump coupler such as a wavelength-division-multiplexing (WDM) coupler. If desired, a circulator arrangement may be used to couple pump light into coil 48 of FIG. 26.

Input signals from input 40 pass through tap 114, tap 116, and pump coupler 52. These input signals are amplified in coil 48. The gain spectrum of coils such as coil 48 will typically not match the design requirements for the overall amplifier gain without modification. For example, it may be desired for amplifier 18 to have a flat gain spectrum, whereas the gain spectrum of coil 48 may have a significant peak. Accordingly, a spectrum filter 130 may be used to modify the gain spectrum of the amplifier. Filter 130 may be a gain equalization filter (gain flattening filter) that flattens the output spectrum from coil 48, or may be a filter that smooths gain peaks while producing a tilted amplifier gain spectrum, or may be any other suitable spectrum-modifying filter.

During operation of amplifier 18, control unit 62 receives digital signals from the analog-to-digital converters in monitors 120, 122, and 124 for processing. Control unit 62 may be based on any suitable control electronics such as one or more microprocessors, microcontrollers, digital signal processors, programmable logic devices, application-specific integrated circuits, etc.

Control unit 62 may process the spectrally-filtered input power information received from monitor 122 to calculate a spectrally-modified feed-forward pump contribution $P_{PUMP\text{-}FF}$ using equation 1. Control unit 62 may also process the spectrally-filtered power information received from monitor 124 and the unfiltered power information received from monitor 120 to calculate a spectrally-modified feedback pump contribution $P_{PUMP\text{-}FB}$ using equations 2–4. These contributions to the calculated pump power for the amplifier of FIG. 26 may be combined. Any suitable combining function f may be used, as set forth in equation 5.

$$P_{PUMP} = f(P_{PUMP\text{-}FF}, P_{PUMP\text{-}FB}) \quad (5)$$

As an example, $P_{PUMP}$ may be calculated by linearly combining $P_{PUMP\text{-}FF}$ and $P_{PUMP\text{-}FB}$ as set forth in equation 6.

$$P_{PUMP} = P_{PUMP\text{-}FF} + P_{PUMP\text{-}FB} \quad (6)$$

The calculated pump power may be adjusted (if necessary) to ensure that the pump 50 operates within normal operating limits. For example, if the calculated pump power value is below the minimum required to ensure that the lasing threshold of pump 50 is surpassed, the calculated pump power may be raised to the lasing threshold value. If the calculated pump power value is above the maximum safe operating limit of pump 50, the calculated pump power may be lowered to ensure that the pump is not damaged.

The pump may be driven at the calculated pump power level by supplying an appropriate drive signal to pump 50 using control unit 62, digital-to-analog converter 66, and pump driver 68 of FIG. 26.

This procedure may be performed in a continuous loop (e.g., once every 100 ns or other appropriate time period).

An advantage of using a hybrid control scheme is that it may allow transients to be controlled more accurately than would be possible using a less sophisticated control scheme. For example, the feed-forward contribution in the hybrid control scheme may allow the amplifier to respond relatively quickly to input power variations and the feedback contribution in the hybrid control scheme may allow the amplifier to correct for gain drift arising from fiber and component aging.

A schematic diagram of a generalized amplifier with input and power taps and power tap spectral filtering capabilities is shown in FIG. 27. Amplifier 18 may have one or more gain stages such as gain stage 132. The gain stages may be based on one or more rare-earth-doped fiber coils such as erbium-doped fiber coils. Taps such as taps 134 and 136 may be used to tap some of the optical power flowing in the main fiber path between input 138 and output 140. Optical paths 142 may be used to provide the tapped input and output power signals to optical filters and monitoring circuitry 144. The optical filters and monitoring circuitry may be used to filter the tapped input and output powers and to convert measured optical signals into electrical signals that may be handled by control unit 146. Control unit 146 may be used to control the operation of amplifier 18. For example, control unit 146 may use electrical path 148 to control the optical pumping in gain stage 132 using a hybrid control scheme such as the control scheme described in connection with equations 5 and 6.

An illustrative generalized amplifier arrangement that may be used in a feed-forward-based transient control scheme is shown in FIG. 28. Input power at input 150 may be tapped and spectrally-filtered using tap 154 and spectrum filter 156. The transmission spectrum of filter 156 may be configured to be directly proportional to the gain spectrum of the gain media in gain stage 158. The gain media may be one or more optically-pumped rare-earth-doped fiber coils such as erbium-doped fiber coils. Monitor 160 may be used to convert optical signals from filter 156 into electrical signals for control unit 162. Control unit 162 may be used to control the operation of amplifier 18. For example, control unit 162 may use electrical path 164 to control the optical pumping in gain stage 158 using a feed-forward control scheme such as the control scheme described in connection with equation 1.

An illustrative generalized amplifier arrangement that may be used in a feedback-based transient control scheme is shown in FIG. 29. Input power at input 166 may be tapped using tap 168. Output power at output 170 may be tapped and spectrally-filtered using tap 172 and spectrum filter 174. The transmission spectrum of filter 174 may be configured to be inversely proportional to the overall gain spectrum of gain stage 184. Gain stage 184 may include one or more optically-pumped rare-earth-doped fiber coils such as erbium-doped fiber coils and other components such as filters, attenuators, etc. Monitor 176 may be used to convert optical signals from tap 168 into electrical signals for control unit 180. Monitor 178 may be used to convert optical signals from filter 174 into electrical signals for control unit 180. Control unit 180 may be used to control the operation of amplifier 18. For example, control unit 180 may use electrical path 182 to control the optical pumping in gain stage 184 using a feedback control scheme such as the control scheme described in connection with equations 2–4.

If desired, spectrum filters may be provided on both input and output taps (or on just an input tap) for use in a feedback-based transient control scheme. An illustrative generalized amplifier arrangement of this type is shown in FIG. 30. Input power at input 186 may be tapped and spectrally-filtered using tap 190 and spectrum filter 194. Output power at output 188 may be tapped and spectrally-filtered using tap 192 and spectrum filter 196. The transmission spectrums of filters 194 and 196 may be configured so that the ratio R of the transmission spectrum of filter 196 (F2) to the transmission spectrum of filter 194 (F1) is inversely proportional to the overall gain spectrum of gain stage 206. Gain stage 206 may include one or more optically-pumped rare-earth-doped fiber coils such as erbium-doped fiber coils and other components such as filters, attenuators, etc. Monitor 198 may be used to convert optical signals from filter 194 into electrical signals for control unit 202. Monitor 200 may be used to convert optical signals from filter 196 into electrical signals for control unit 202. Control unit 202 may be used to control the operation of amplifier 18. For example, control unit 202 may use electrical path 204 to control the optical pumping in gain stage 206 using a feedback control scheme such as the control scheme described in connection with equations 2–4, in which the modified gain $G_{MODIFIED}$ is given by the expression of equation 7.

$$G_{MODIFIED} = P_2/P_1 \tag{7}$$

In equation 7, $P_1$ is the power measured after filter 194 and $P_2$ is the power measured after filter 196, as shown in FIG. 30.

If desired, filter 194 (F1) may be configured to be directly proportional to the gain spectrum of the gain medium in stage 206 at the same time that the ratio R is configured to be inversely proportional to the overall gain spectrum of stage 206. With this arrangement, spectrally-filtered information for feed-forward control may be provided using filter 194 and spectrally-filtered gain information for feedback control may be provided using filters 196 and 194. A hybrid control arrangement using both spectrally-filtered feed-forward and spectrally-filtered feedback control may therefore be provided using the two-tap amplifier configuration of FIG. 30.

Figure 31:
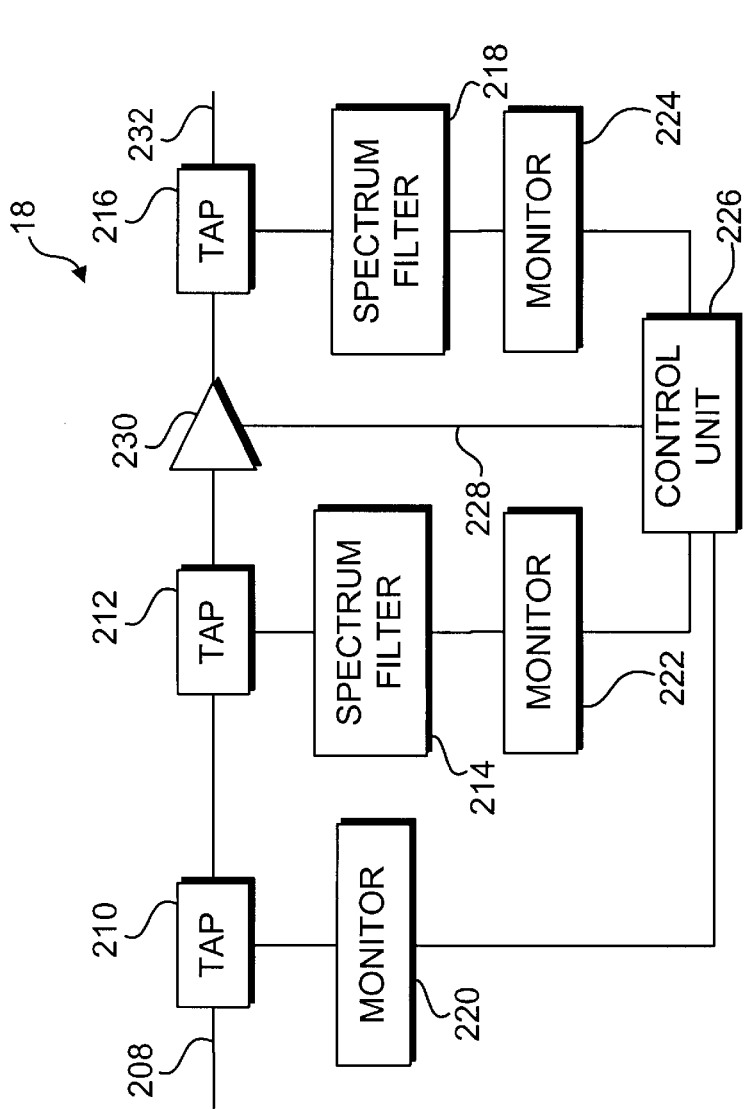
FIG. 31 is a schematic diagram of an illustrative optical amplifier having an unfiltered optical power tap and having a spectrum filters for filtering tapped optical input and output signals for use in transient control schemes in accordance with the present invention.

Another amplifier configuration that may be used for a hybrid transient control scheme is shown in FIG. 31. Input power at input 208 may be tapped using tap 210. Input power at input 208 may be tapped and spectrally-filtered using tap 212 and spectrum filter 214. Output power at output 232 may be tapped and spectrally-filtered using tap 216 and spectrum filter 218.

Gain stage 230 of FIG. 31 may include one or more optically-pumped rare-earth-doped fiber coils such as erbium-doped fiber coils and other components such as filters, attenuators, etc. Monitor 220 may be used to convert optical signals from tap 210 into electrical signals for control unit 226. Monitor 222 may be used to convert optical signals from filter 214 into electrical signals for control unit 226. Monitor 224 may be used to convert optical signals from filter 218 into electrical signals for control unit 226. Control unit 226 may be used to control the operation of amplifier 18. For example, control unit 226 may use electrical path 228 to control the optical pumping in gain stage 230 using a hybrid control scheme such as the control scheme described in connection with equations 5 and 6.

Filtered input power may be measured at monitor 222 by configuring the transmission spectrum of filter 214 to match the spectrum of the gain medium (e.g., the erbium fiber coils) in gain stage 230. Filtered output power may be measured by configuring the transmission spectrum of filter 218 to be inversely proportional to the overall gain spectrum of gain stage 230. Modified gain ($G_{MODIFIED}$) may be measured by using monitors 224 and 220 to measure the ratio of the filtered output power to the unfiltered input power. If desired, other filter configurations may be used on the input and output taps to measure $G_{MODIFIED}$, as described in connection with FIG. 30 and equation 7.

Figure 32:
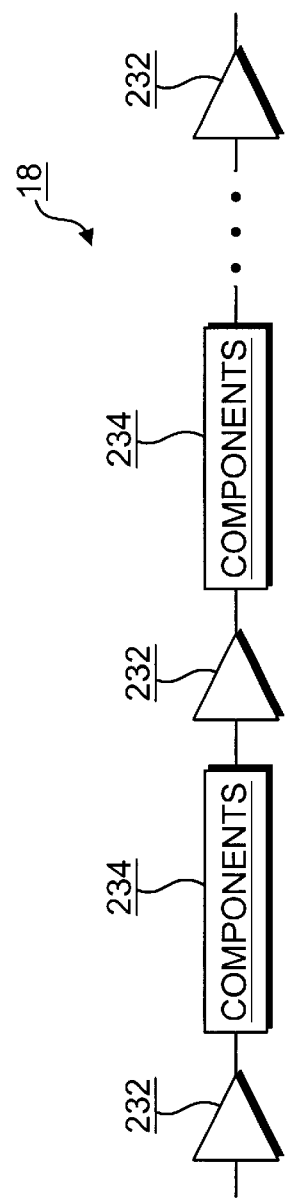
FIG. 32 is a schematic diagram showing how an illustrative optical amplifier may have multiple gain medium elements and other components in accordance with the present invention.

As shown in FIG. 32, the gain medium of an amplifier 18 may be made up of multiple individual gain medium elements 232. Passive components 234 may modify the gain spectrum provided by the gain medium. Gain medium elements 232 may be, for example, optically-pumped rare-earth-doped fiber coils such as erbium-doped fiber coils. Components 234 may be other amplifier components such as variable optical attenuators, dispersion compensating fiber, telemetry channel filters, filters such as gain equalization filters, isolators, pumps, taps, etc.

Figure 33:
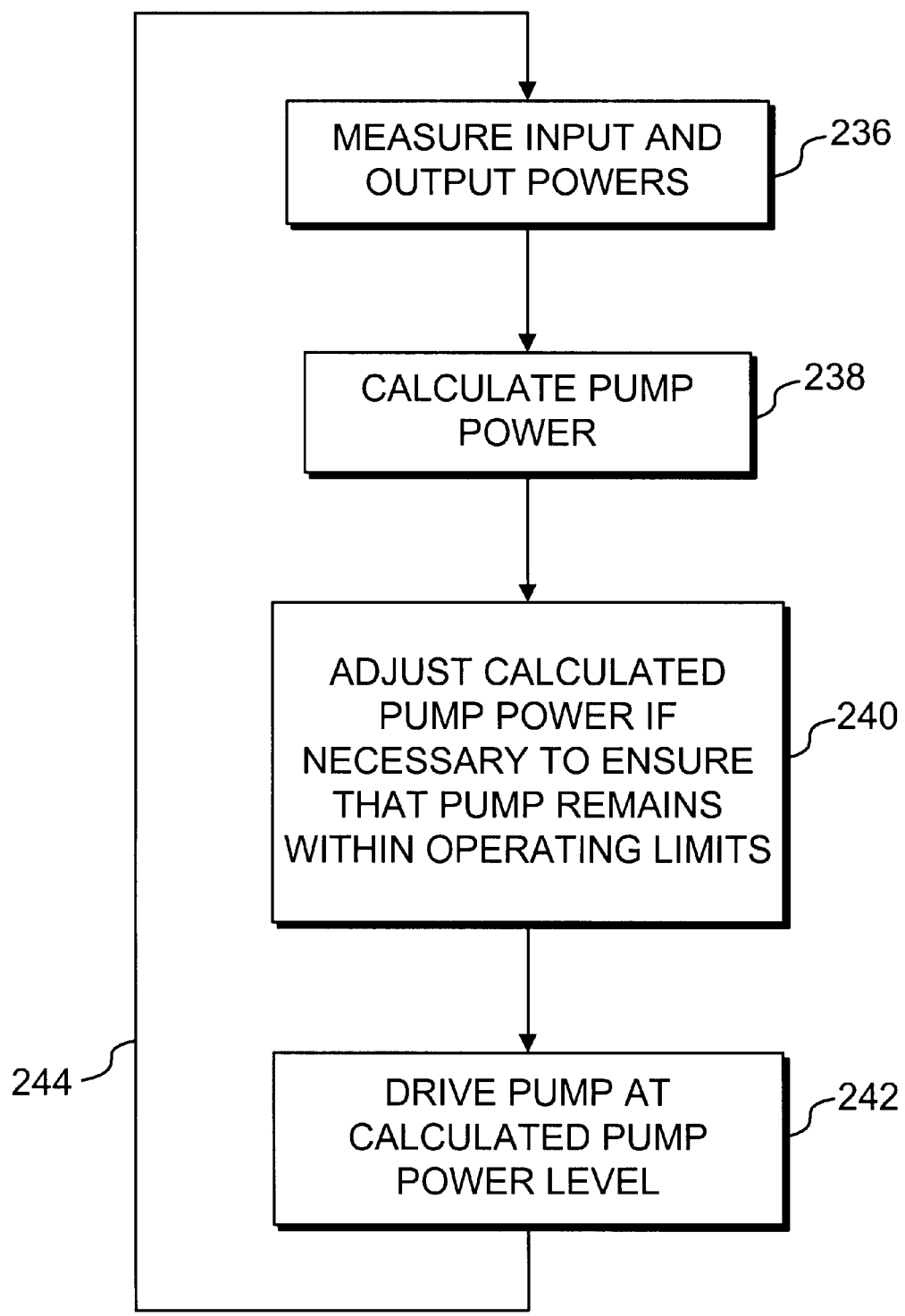
FIG. 33 is a flow chart of illustrative steps involved in providing transient control using a hybrid feed-forward and feedback control scheme in an amplifier having input and output tap filtering in accordance with the present invention.

Illustrative steps involved in controlling amplifier transients in an optical amplifier such as the optical amplifier of FIG. 26 or the amplifier of FIG. 27 using the hybrid transient control technique described in connection with equations 5 and 6 are shown in FIG. 33. The steps of FIG. 33 may be performed in a continuous loop. For example, steps 236, 238, 240, and 242 may all be performed once every 100 ns.

At step 236, amplifier 18 of FIG. 26 may use monitors 120, 122, and 124 to measure unfiltered input power and to measure filtered input and output powers or amplifier 18 of FIG. 27 may use circuitry 144 to measure unfiltered input power and to measure filtered input and output powers.

At step 238, control unit 62 of FIG. 26 or control unit 146 of FIG. 27 may calculate the appropriate pump power for optically pumping the amplifier's gain medium using equation 6 or other suitable arrangement for combining feed-forward and feedback contributions to the calculated pump power.

At step 240, control unit 62 or control unit 146 may adjust the calculated pump power if necessary to ensure that the pump is operated within normal operating limits. For example, if the calculated pump power value is below the minimum required to ensure that the lasing threshold of the pump is surpassed, the calculated pump power may be raised to the lasing threshold value. If the calculated pump power value is above the maximum safe operating limit of the pump, the calculated pump power may be lowered to ensure that the pump is not damaged.

At step 242, the pump for amplifier 18 of FIG. 26 or FIG. 27 may be driven at the calculated pump power level by supplying an appropriate drive signal to the pump using control unit 62, digital-to-analog converter 66, and pump driver 68 or using control unit 146 and the associated control electronics in amplifier 18 of FIG. 27.

As shown by line 244, after step 242 is completed, steps 236, 238, 240, and 242 are repeated. The loop speed is determined by the capabilities of the control electronics. In general, the control electronics in the amplifier should be selected to operate as rapidly as possible within cost constraints.

If desired, other control schemes may be used. For example, a hybrid control scheme may be used in which the feed-forward pump contribution $P_{PUMP-FF}$ is based on an unfiltered input power tap signal $P_{IN}$ using equation 8 or other suitable feed-forward functional form that relates pump power to input power.

$$P_{PUMP-FF} = c\, P_{IN} + d \tag{8}$$

The fitting constants "c" and "d" of equation 8 may be determined experimentally. The feedback contribution to the pump $P_{PUMP-FB}$ may be calculated based on spectrally-filtered power tap measurements using equations 2–4 or equations 7, 3, and 4. The feed-forward pump contribution $P_{PUMP\text{-}FF}$ and the feedback contribution $P_{PUMP\text{-}FB}$ may be combined as described in connection with equations 5 and 6.

A hybrid scheme may also be used in which the feedback contribution $P_{PUMP\text{-}FB}$ is calculated using the unfiltered gain measurement shown in equation 9 in place of the modified gain measurements of equations 2 and 7.

$$G = P_{OUT}/P_{IN} \qquad (9)$$

For this scenario, the spectrum of the overall gain of the amplifier should be relatively flat. The feed-forward contribution $P_{PUMP\text{-}FF}$ may be calculated using equation 1 or other suitable functional form relating feed-forward pump power to the measured spectrally-filtered input power. Equations 3 and 4 may be used to calculate $P_{PUMP\text{-}FB}$ using G from equation 9 as the measured gain. The pump power at which to pump the amplifier's gain medium may be calculated based on $P_{PUMP\text{-}FF}$ and $P_{PUMP\text{-}FB}$ as described in connection with equations 5 and 6.

It will be understood that the foregoing is merely illustrative of the principles of this invention, and that various modifications can be made by those skilled in the art without departing from the scope and spirit of the invention.

What is claimed is:

1. A method for controlling gain transients in a rare-earth-doped fiber amplifier with a non-flat gain spectrum, wherein the rare-earth-doped fiber amplifier has rare-earth-doped fiber that is pumped using a pump laser to produce a gain spectrum so that optical signals that are provided to an input are amplified and provided as corresponding amplified optical signals at an output, comprising:

tapping the optical signals at the input and the output of the amplifier;

measuring a modified gain for the amplifier by spectrally-filtering at least some of the optical signals and at least partly using the spectrally filtered optical signals to calculate the modified gain; and adjusting the pump power produced by the pump laser using a feedback control technique that maintains the modified gain at a constant value, wherein measuring the modified gain comprises spectrally filtering the tapped optical signals at the amplifier output using a spectral filter with a transmission spectrum that is inversely proportional to the non-flat gain spectrum.

2. A method for controlling gain transients in a rare-earth-doped fiber amplifier with a non-flat gain spectrum, wherein the rare-earth-doped fiber amplifier has rare-earth-doped fiber that is pumped using a pump laser to produce a gain spectrum so that optical signals that are provided to an input are amplified and provided as corresponding amplified optical signals at an output, comprising:

tapping the optical signals at the input and the output of the amplifier;

measuring a modified gain for the amplifier by spectrally-filtering at least some of the optical signals and at least partly using the spectrally filtered optical signals to calculate the modified gain; and adjusting the pump power produced by the pump laser using a feedback control technique that maintains the modified gain at a constant value, wherein measuring the modified gain comprises spectrally filtering the tapped optical signals at the amplifier input using a spectral filter with a transmission spectrum that is proportional to the non-flat gain spectrum.

3. A method for controlling gain transients in a rare-earth-doped fiber amplifier with a non-flat gain spectrum, wherein the rare-earth-doped fiber amplifier has rare-earth-doped fiber that is pumped using a pump laser to produce a gain spectrum so that optical signals that are provided to an input are amplified and provided as corresponding amplified optical signals at an output, comprising:

tapping the optical signals at the input and the output of the amplifier;

measuring a modified gain for the amplifier by spectrally-filtering at least some of the optical signals at the amplifier input using a spectral filter with a transmission spectrum that is proportional to the gain spectrum of the rare-earth doped fiber and at least partly using the spectrally filtered optical signals to calculate the modified gain; and adjusting the pump power produced by the pump laser using a feedback control technique that maintains the modified gain at a constant value.

4. A method for controlling gain transients in a rare-earth-doped fiber amplifier with a non-flat gain spectrum, wherein the rare-earth-doped fiber amplifier has rare-earth-doped fiber that is pumped using a pump laser to produce a gain spectrum so that optical signals that are provided to an input are amplified and provided as corresponding amplified optical signals at an output, comprising:

tapping the optical signals at the input and the output of the amplifier;

measuring a modified gain for the amplifier by spectrally-filtering at least some of the optical signals and at least partly using the spectrally filtered optical signals to calculate the modified gain; and adjusting the pump power produced by the pump laser using a feedback control technique that maintains the modified gain at a constant value, wherein measuring the modified gain comprises spectrally filtering the tapped optical signals at the amplifier input using a spectral filter with a transmission spectrum that is proportional to the gain spectrum of the rare-earth-doped fiber and spectrally filtering the tapped optical signals at the amplifier output using a spectral filter with a transmission spectrum that is configured so that the ratio of the transmission spectrum of the filter at the output to the transmission spectrum of the filter at the input is inversely proportional to the non-flat gain spectrum of the amplifier.

5. A method for controlling gain transients in a rare-earth-doped fiber amplifier with a non-flat gain spectrum, wherein the rare-earth-doped fiber amplifier has rare-earth-doped fiber that is pumped using a pump laser to produce a gain spectrum so that optical signals that are provided to an input are amplified and provided as corresponding amplified optical signals at an output, comprising:

tapping the optical signals at the input and the output of the amplifier;

measuring a modified gain for the amplifier by spectrally-filtering at least some of the optical signals and at least partly using the spectrally filtered optical signals to calculate the modified gain; and adjusting the pump power produced by the pump laser using a feedback control technique that maintains the modified gain at a constant value, wherein measuring the modified gain comprises spectrally filtering the tapped optical signals with a spectral filter at the input and a spectral filter at the output, wherein the spectral filters at the input and output have transmission spectra that are configured so that the ratio of the transmission spectrum of the filter at the output to the transmission spectrum of the filter at the input is inversely proportional to the non-flat gain spectrum of the amplifier.

6. An optical amplifier that amplifies optical signals at different wavelengths in a fiber-optic communications link, comprising:

a control unit;

an in put fiber that receives optical signals to be amplified;

an output fiber at which amplified optical signals are provided;

rare-earth-doped fiber that is optically pumped to provide optical gain for the optical signals between the input fiber and the output fiber;

at least one pump that optically pumps the rare-earth-doped fiber, wherein the optically-pumped rare-earth-doped fiber has a gain spectrum and wherein the amplifier has a gain spectrum that is not flat;

an input tap that taps the optical signals at the input fiber;

input monitoring circuit that receives optical signals from the input tap and converts the received optical signals from the input tap into electrical signals for processing by the control unit;

an output tap that taps the optical signals at the output fiber;

a spectrum filter at the output tap that spectrally modifies the optical signals at the output tap, wherein the spectrum filter has a transmission spectrum that is inversely proportional to the non-flat gain spectrum of the amplifier; and output monitoring circuitry that receives optical signals from the output tap that have been spectrally modified by the spectrum filter and converts the received optical signals from the output tap into electrical signals for processing by the control unit, wherein the control unit controls the power of the pump to prevent gain transients using a feedback control technique based on the electrical signals from the input and output monitoring circuitry.

7. An optical amplifier that amplifies optical signals at different wavelengths in a fiber-optic communications link, comprising:

a control unit;

an input fiber that receives optical signals to be amplified;

an output fiber at which amplified optical signals are provided;

rare-earth-doped fiber that is optically pumped to provide optical gain for the optical signals between the input fiber and the output fiber;

at least one pump that optically pumps the rare-earth-doped fiber, wherein the optically-pumped rare-earth-doped fiber has a gain spectrum and wherein the amplifier has a gain spectrum that is not flat;

an input tap that taps the optical signals at the input fiber;

a spectrum filter at the input tap with a transmission spectrum that matches the gain spectrum of the rare-earth-doped fiber;

input monitoring circuit that receives optical signals from the input tap and converts the received optical signals from the input tap into electrical signals for processing by the control unit;

an output tap that taps the optical signals at the output fiber;

a spectrum filter at the output tap that spectrally modifies the optical signals at the output tap; and output monitoring circuitry that receives optical signals from the output tap that have been spectrally modified by the spectrum filter and converts the received optical signals from the output tap into electrical signals for processing by the control unit, wherein the control unit controls the power of the pump to prevent gain transients using a feedback control technique based on the electrical signals from the input and output monitoring circuitry.

8. An optical amplifier that amplifies optical signals at different wavelengths in a fiber-optic communications link, comprising:

a control unit;

an input fiber that receives optical signals to be amplified;

an output fiber at which amplified optical signals are provided;

rare-earth-doped fiber that is optically pumped to provide optical gain for the optical signals between the input fiber and the output fiber;

at least one pump that optically pumps the rare-earth-doped fiber, wherein the optically-pumped rare-earth-doped fiber has a gain spectrum and wherein the amplifier has a gain spectrum that is not flat;

an input tap that taps the optical signals at the input fiber;

input monitoring circuit that receives optical signals from the input tap and converts the received optical signals from the input tap into electrical signals for processing by the control unit;

an output tap that taps the optical signals at the output fiber;

a spectrum filter at the output tap that spectrally modifies the optical signals at the output tap; and output monitoring circuitry that receives optical signals from the output tap that have been spectrally modified by the spectrum filter and converts the received optical signals from the output tap into electrical signals for processing by the control unit, wherein the control unit controls the power of the pump to prevent gain transients using a feedback control technique based on the electrical signals from the input and output monitoring circuitry, wherein the spectrum filter at the output tap has a transmission spectrum that is inversely proportional to the non-flat gain spectrum of the amplifier and wherein the control unit controls the power of the pump to prevent gain transients at least partly using a feedforward control technique based on the electrical signals from the input monitoring circuitry.

* * * * *